(12) United States Patent
Deptuch et al.

(10) Patent No.: US 12,206,530 B2
(45) Date of Patent: Jan. 21, 2025

(54) USER-CONFIGURABLE HIGH-SPEED LINE DRIVER

(71) Applicant: Brookhaven Science Associates, LLC, Upton, NY (US)

(72) Inventors: Grzegorz W. Deptuch, Great Neck, NY (US); Nicholas Benjamin St. John, East Patchogue, NY (US); Soumyajit Mandal, Merrick, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 0 days.

(21) Appl. No.: 18/151,171

(22) Filed: Jan. 6, 2023

(65) Prior Publication Data
US 2023/0231746 A1 Jul. 20, 2023

Related U.S. Application Data

(60) Provisional application No. 63/297,198, filed on Jan. 6, 2022.

(51) Int. Cl.
*H04L 25/03* (2006.01)
*H04L 7/033* (2006.01)

(52) U.S. Cl.
CPC ...... *H04L 25/03038* (2013.01); *H04L 7/0331* (2013.01); *H04L 2025/03477* (2013.01); *H04L 2025/03509* (2013.01)

(58) Field of Classification Search
CPC .......... H04L 25/03038; H04L 7/0331; H04L 2025/03477; H04L 2025/03509
See application file for complete search history.

(56) References Cited

U.S. PATENT DOCUMENTS

| | | | |
|---|---|---|---|
| 6,853,220 B2 | 2/2005 | De Laurentiis et al. | |
| 6,975,132 B2 | 12/2005 | Groen et al. | |
| 8,358,156 B1 * | 1/2013 | Abugharbieh | H04L 25/0286 327/108 |
| 10,826,536 B1 * | 11/2020 | Beukema | H03M 13/19 |
| 11,704,051 B2 * | 7/2023 | Bae | G11C 7/1066 365/194 |

(Continued)

OTHER PUBLICATIONS

Xiaoran et al., A Hybrid Line Driver with Voltage-Mode SST Pre-Emphasis and Current-Mode Equalization, 2020, IEEE Xplore, pp. 750-753 (Year: 2020).*

(Continued)

*Primary Examiner* — Freshteh N Aghdam
(74) *Attorney, Agent, or Firm* — Dorene Price

(57) ABSTRACT

An adaptive line driver circuit configured to transmit a signal over a wired link includes a delay-locked loop (DLL) circuit, which includes a phase detector (PD) circuit, charge pump (CP) circuit, and voltage-controlled delay line (VCDL) circuit operatively coupled together. The delay-locked loop circuit provides pre-emphasis and feed-forward equalization of the signal. The delay locked loop circuit also provides a user-configurable parameter including at least one of pre-data tap amplitude, data tap amplitude, post-data tap amplitude, pre-data tap duration, post-data tap duration, pre-data tap quantity, and post-data tap quantity. The adaptive line driver circuit further includes a source-series terminated (SST) driver circuit operatively coupled to the delay-locked loop circuit.

10 Claims, 20 Drawing Sheets

(56) References Cited

U.S. PATENT DOCUMENTS 11,824,695 B2 * 11/2023 Valaee .................. H04L 25/028

OTHER PUBLICATIONS

So, B.-C., et al., "A Multi-Gigabit CMOS Serial Link Transceiver using Jitter Tolerant Delay Locked Loop," 2003 IEEE Conference on Electron Devices and Solid-State Circuits (IEEE Cat. No.03TH8668), Hong Kong, China, (2003) pp. 171-174.
Gromov, V., et al., "Development of a low power 5.12 Gbps data serializer and wireline transmitter circuit for the VeloPix chip," Journal of Instrumentatoin, 10 C01054 (2015) (8 pages).

* cited by examiner

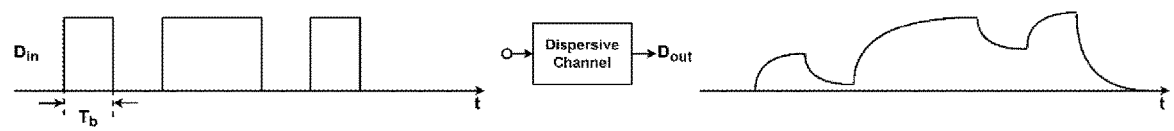
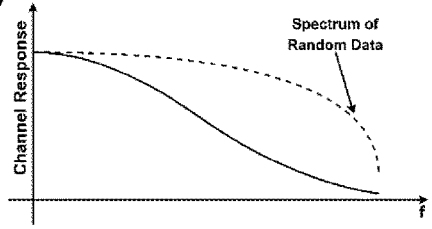
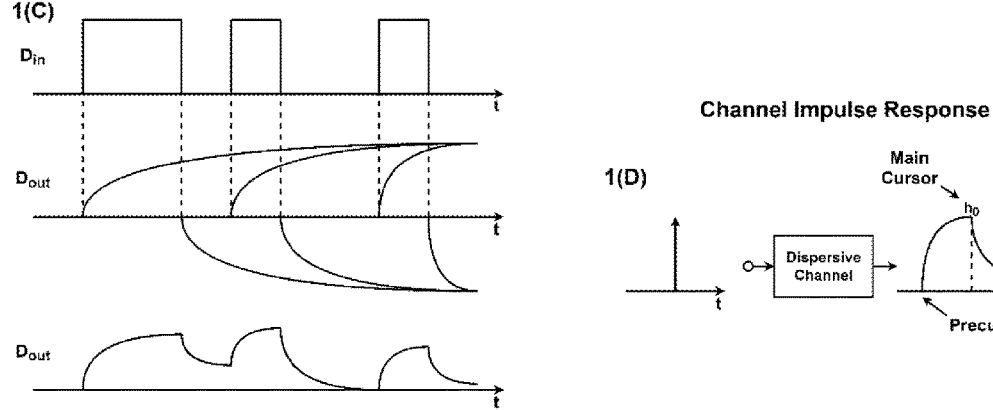
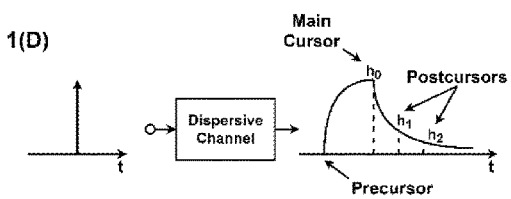
FIGs. 1(A)-(D)

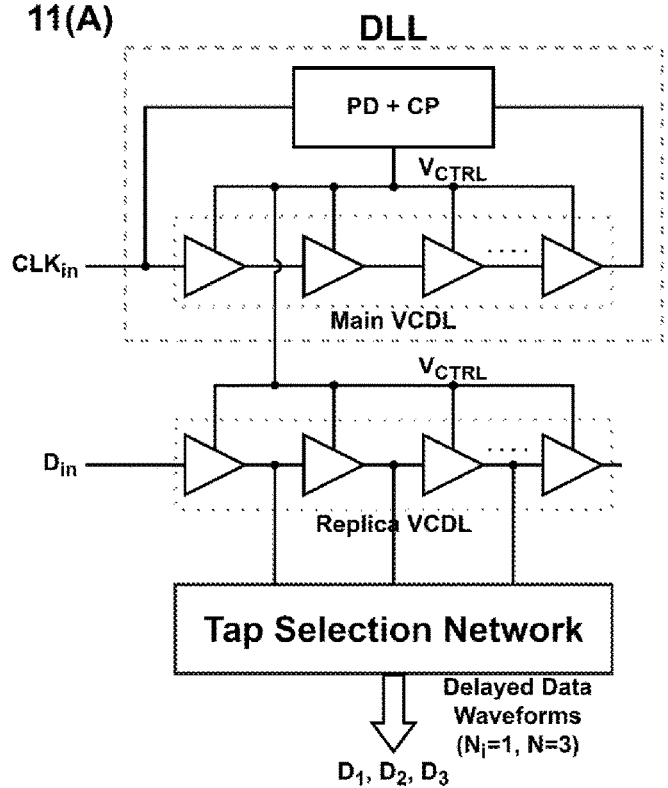
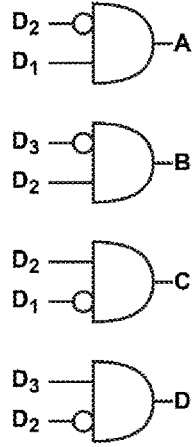
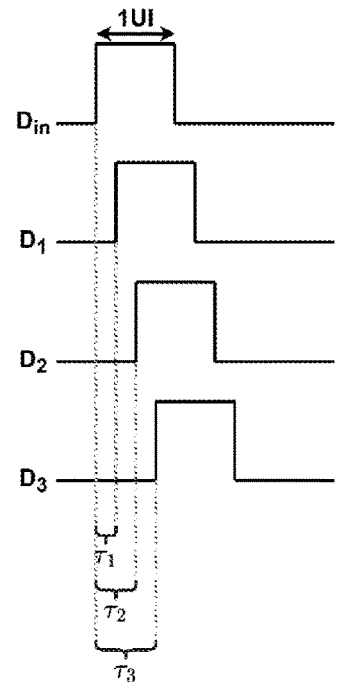
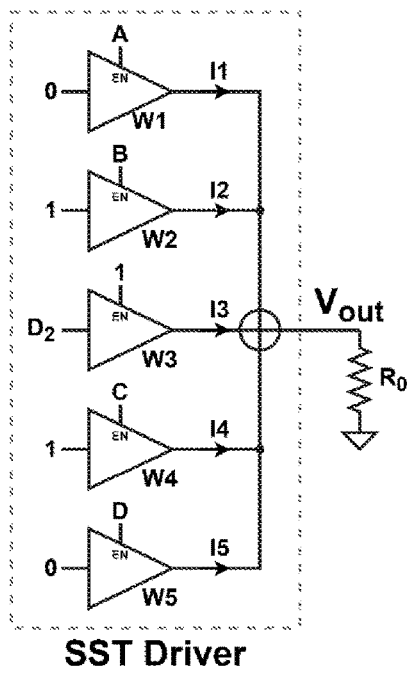
FIGS. 11(A)-11(C)

USER-CONFIGURABLE HIGH-SPEED LINE DRIVER

CROSS-REFERENCE TO RELATED APPLICATIONS

This application claims the benefit of U.S. Provisional Patent Application No. 63/297,198, filed on Jan. 6, 2022, entitled "User-Configurable High-Speed Line Driver," the disclosure of which is incorporated by reference herein in its entirety for all purposes.

STATEMENT OF GOVERNMENT RIGHTS

The present invention was made with government support under contract number DE-SC0012704 awarded by the U.S. Department of Energy. The United States government may have certain rights in this invention.

BACKGROUND

The disclosed embodiments generally relate to an adaptive line driver that provides pre-emphasis for use in high-speed cable transmissions.

SUMMARY

The disclosed embodiments provide an adaptive line driver circuit configured to transmit a signal over a wired link. The adaptive line driver circuit includes a delay-locked loop (DLL) circuit, which includes a phase detector (PD) circuit, charge pump (CP) circuit, and voltage-controlled delay line (VCDL) circuit operatively coupled together. The delay-locked loop circuit provides user-configurable durations of pre-emphasis and feed-forward equalization of the signal. The delay-locked loop circuit also provides a user-configurable parameter including at least one of pre-data tap amplitude, data tap amplitude, post-data tap amplitude, pre-data tap duration, post-data tap duration, pre-data tap quantity, and post-data tap quantity. The adaptive line driver circuit further includes an array of source-series terminated (SST) driver circuits operatively coupled to the delay-locked loop circuit and used to drive respective data taps. These arrays can also be programmed by the user to configure nominal and pre-emphasized data swing.

The adaptive line driver may include a false lock correction circuit within the delay-locked loop circuit. This circuit indicates a condition known as false lock in which the total delay of the DLL exceeds one unit interval (UI) in a locked state. The circuit checks for false locking via a one-time test of each internal delay within the DLL's delay line. If no false lock is detected, the circuit shuts itself down to conserve power, only to be turned back on upon system reset. If a false lock is detected, the circuit generates a digital flag that can be read by the user.

The adaptive line driver may utilize a pre-emphasis parameter optimization circuit operatively coupled to the line driver circuit, which iteratively calculates an optimal value of the user-configurable parameter based on a value of an eye opening.

The adaptive line driver may include an interpolator circuit operatively coupled to the delay-locked loop circuit, which configures at least one of the pre-data tap duration and post-data tap duration to be equal to a fraction of a unit interval (UI). The UI is equal to one transmitting symbol interval.

The disclosed embodiments further provide a method of transmitting a signal over a wired link, which includes: providing pre-emphasis and feed-forward equalization of configurable duration to the signal using a delay-locked loop circuit, wherein the delay-locked loop circuit includes a phase detector circuit, charge pump circuit, and voltage-controlled delay line circuit operatively coupled together; providing a number of user-configurable output tap delays; and driving the signal over the wired link using an array of source-series terminated (SST) driver circuits, wherein the SST driver array is operatively coupled to the data re-timing circuit and also provides user-configurable parameters to set the nominal and pre-emphasized signal levels (i.e., output tap weights).

The disclosed embodiments yet further provide a computer-readable medium including instructions encoded thereon that, when executed by a processing device, perform operations including: providing pre-emphasis and feed-forward equalization of the signal using a delay-locked loop circuit, wherein the delay-locked loop circuit includes a phase detector circuit, charge pump circuit, and voltage-controlled delay line circuit operatively coupled together; providing a user-configurable parameter using the delay locked loop circuit, wherein the user-configurable parameter includes at least one of pre-data tap amplitude, data tap amplitude, post-data tap amplitude, pre-data tap duration, post-data tap duration, pre-data tap quantity, and post-data tap quantity; and driving the signal over the wired link using a source-series terminated (SST) driver circuit, wherein the SST driver circuit is operatively coupled to the delay-locked loop circuit.

Other embodiments will become apparent from the following detailed description considered in conjunction with the accompanying drawings. It is to be understood, however, that the drawings are designed as an illustration only and not as a definition of the limits of any of the embodiments.

BRIEF DESCRIPTION OF THE DRAWINGS

The following drawings are provided by way of example only and without limitation, wherein like reference numerals (when used) indicate corresponding elements throughout the several views, and wherein:

FIGS. 1(A)-1(B) illustrate effects of frequency-dependent channels, and thus channel loss, on digital data;

FIG. 1(A) illustrates transfer of signal through a dispersive channel;

FIG. 1(B) shows frequency spectrum of data by plotting frequency (f) of components by channel response; dashed line is spectrum of random data and solid line is channel response frequency response of a channel is narrower than spectrum of random data FIG. 1(C) shows a result of $D_{out}$ that is a superposition of individual pulses that are going through the dispersive channel. Each pulse in $D_{in}$ is deformed by a limited frequency response of the channel and all the edges result in intersymbol modulation. The first $D_{out}$ is a result of deformation of individual pulses (in $D_{in}$) and second $D_{out}$ is superposition of all individually deformed pulses—taking what is in the first $D_{out}$ and constructs the second $D_{out}$ FIG. 1(D) shows impulse response of dispersive channel

FIGS. 11(A)-11(C) show a top-level block diagram of an alternative implementation of an adaptive line driver in accordance with one or more embodiments disclosed herein;

Figure 2:
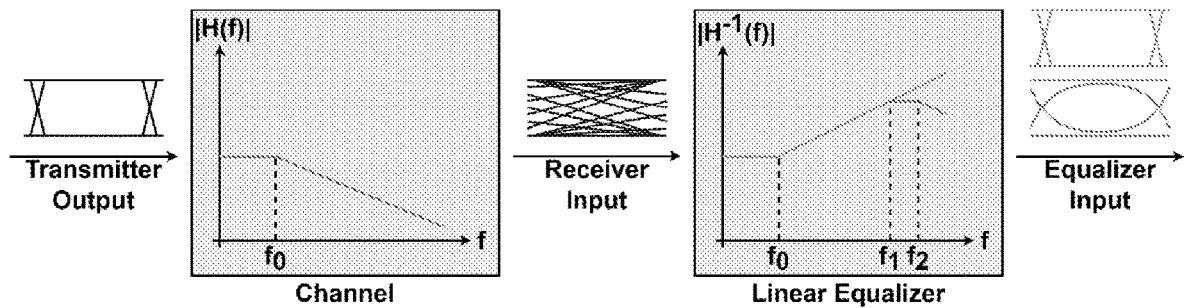
FIG. 2 illustrates linear equalization as viewed in the frequency-domain.

It is to be appreciated that elements in the figures are illustrated for simplicity and clarity. Common but well-understood elements that are useful or necessary in a commercially feasible embodiment are not shown in order to facilitate a less hindered view of the illustrated embodiments.

DETAILED DESCRIPTION

High-speed line driver design has become a critical topic since digital systems continue to communicate over wired links, which are also known as cables, at ever increasing data rates and the properties of both the link and the output load can vary widely depending on the application. Line drivers generally transmit digital data over coupled pairs of transmission lines using various differential signaling protocols to minimize energy consumption and eliminate common-mode interference. However, while many different integrated line driver designs have been developed, these designs are application-specific, requiring system-wide redesign before the designs can be used for a different project. Since this is an inefficient and time-consuming method, a fully integrated CMOS line driver circuit that has a variety of user configurable settings, thereby enabling users to find optimal driver settings based on the specific line characteristics and load, provides substantial advantages. These user settings have both coarse and fine variability, thus allowing the driver to fit a variety of applications, and also enable adjustment to account for process-voltage-temperature (PVT) variations. The line driver circuit uses a low-power variable-impedance source-series terminated (SST) driver circuit for high-loss cabling and/or any other application in which impedance matching is a factor.

The proposed driver design also utilizes programmable pre-emphasis circuits to implement feed-forward equalization (FFE) within the transmitter. In this approach, the transmitted waveform is passed through a finite impulse response (FIR) filter, the coefficients for which are designed to cancel the primarily low-pass transfer function of the wired link. Thus, inter-symbol modulation is minimized resulting in a minimized bit error rate (BER) for the link at a given data rate.

Conventional FFE designs implement FIR filters running at a fixed clock frequency, which is generally equal to the data rate. As a result, each pre-emphasis interval is limited to the same duration, which significantly limits the range of output waveforms that can be generated. As a result, it becomes difficult to accurately cancel the complex transfer functions of practical wired links, thereby limiting the BER obtainable at a given data rate.

Embodiments of an improved high-speed line-driver are disclosed herein that use a built-in delay-locked loop (DLL) that enables the duration of each pre-emphasis interval to be adaptively programmed. As a result, a wider range of output waveforms with pre-symbol and/or post-symbol boosting can be generated. This flexibility allows the user to optimize the driver parameters during runtime to handle a variety of application scenarios and/or PVT conditions.

The adaptive line driver can either be implemented using standard CMOS integrated circuit (IC) fabrication processes (such as 65 nm technology), or using alternative IC fabrication techniques, including bipolar and/or BiCMOS processes. In addition, one or more embodiments disclosed herein include N=3 pre-emphasis durations or FIR filter taps, but can be extended to alternative values of N while remaining within the scope of the disclosed subject matter. Further, algorithms can provide monitoring of link performance metrics, including BER and/or eye diagram opening, and automatically adjust various user-programmable parameters of the line driver to optimize metrics for these values.

Beyond user configurability, embodiments of the line driver disclosed herein are optimized for substantially reduced power consumption in comparison to conventional solutions. Initial applications of these embodiments are designed to operate at data rates up to 500 Mbps driving approximately 10 meters of differential stripeline cable with 2 mil thick polyimide dielectric (known as Taiflex™). Such custom cables, which are specifically developed for radio pure links in nuclear physics experiments, use thin dielectrics and conductors and thus do not provide a well-controlled characteristic impedance (e.g., 100 Ω) as required for high-speed data transmission. As a result, such cables suffer from significant impedance discontinuities and also skin-effect dominated transmission losses. However, higher-quality cables would allow for longer transmission distances and/or higher transmission speeds. For such higher-quality cables, extended versions of the embodiments described herein have the capability to operate at higher speeds, such as 10 Gbps. In particular, such high transmission speeds can be achieved due to the ability to generate and handle sub-unit interval (UI) delays internally, that is, inside an integrated circuit (IC). Delays that are fractions of the transmission clock period, even at the highest internal clock speeds, are valuable for pre-emphasizing edges in the transmitted symbols. Such fractional delays are achieved using a delay locking technique, thus resulting in a practical realization of the line driver with configurable pre-emphasis. The techniques disclosed herein thus represent a substantial advantage with respect to standard solutions in which delays are generated solely from the clock edges.

A data transmission circuit ideally ensures error-free communications, in which each bit that is transmitted is guaranteed to be correctly detected by a receiver. Since completely error-free operation is not possible in the real world, minimization of a parameter known as the Bit Error Rate (BER) is sought. The value of BER represents the fraction of transmitted bits that are incorrectly detected by the receiver. The BER is strongly affected by properties of the communication channel, which include both the line or cable and its termination impedance or output load. These parameters affect the signal attenuation due to line loss, signal reflection due to impedance mismatch, and signal rise and/or fall times due to parasitic load capacitance, which result in limiting the channel bandwidth. In general, these undesired effects tend to blur sharp logic transitions, which results in bit detection errors due to inter-symbol interference (ISI).

FIGS. 1(A)-1(B) illustrate the effects of frequency-dependent channels, and thus channel loss, on digital data. Limited channel bandwidth results in attenuation, data-dependent jitter, and ISI. Since the digital data channel is linear, the channel can be modeled in either the time-domain using the impulse response h(t) or the frequency-domain using the transfer function H(f). The former is conventionally decomposed into the pre-cursor, main cursor, and several post-cursors as shown in FIGS. 1(A)-1(D).

Equalization or pre-emphasis is used to compensate for the low-pass transfer function H(f) of the channel, which leads to both attenuation and inter-symbol interference (ISI). Ideally, the equalizer provides the inverse transfer function $H^{-1}$ (f). There are three main types of equalizer circuits. A continuous-time linear equalizer (CTLE) provides an infinite impulse response high-pass filter. A feed-forward equalizer (FFE) provides a finite impulse response high-pass filter, or a linear high-pass filter. FIG. 2 illustrates the frequency-domain view of linear equalization, which can use either a CTLE or an FFE. In contrast, a decision feedback equalizer (DFE) provides a nonlinear filter that uses decisions based on previous symbols to correct the current symbol.

Unlike linear equalizers, DFEs can compensate for ISI without amplifying high frequency noise or crosstalk. However, DFEs can only eliminate ISI over a limited time span, which does not include precursors in FIG. 1(D). Embodiments disclosed herein use an FFE at the transmitter and a DFE at the receiver, thereby enabling utilization of the complementary advantages and disadvantages of FFEs and DFEs.

In the proposed embodiments, FFE, which is also referred to as pre-emphasis, is used to reduce the effects of ISI at the transmitter-end. In this approach, time-shifted and weighted versions of the input data stream $d_i(t)$ are generated and added to the input waveform, thus implementing an N-tap finite impulse response (FIR) filter. Mathematically, the resulting output waveform $d_{out}(t)$ is provided by the following equation.

$$d_{out}(t) = \sum_{n=1}^{N} c_n d_{in}(t - \tau_n) \quad (1)$$

where $\tau_n$ and $c_n$ are the time delays and weights of the FFE taps, respectively. In conventional FFE designs, the time delays $\tau_n$ are limited to integer multiples of the system clock period T, while the weights $c_n$ are adjusted to maximize BER for a given transmit amplitude and data rate. In this case, the transfer function (TF) of the FFE can be modeled in the z-domain by the following equation.

$$D_{out}(z) = H_{FFE}(z)D_{in}(z), \; H_{FFE}(z) \equiv z^{N_i} \sum_{n=1}^{N} c_n z^{-n} \quad (2)$$

Figure 3:
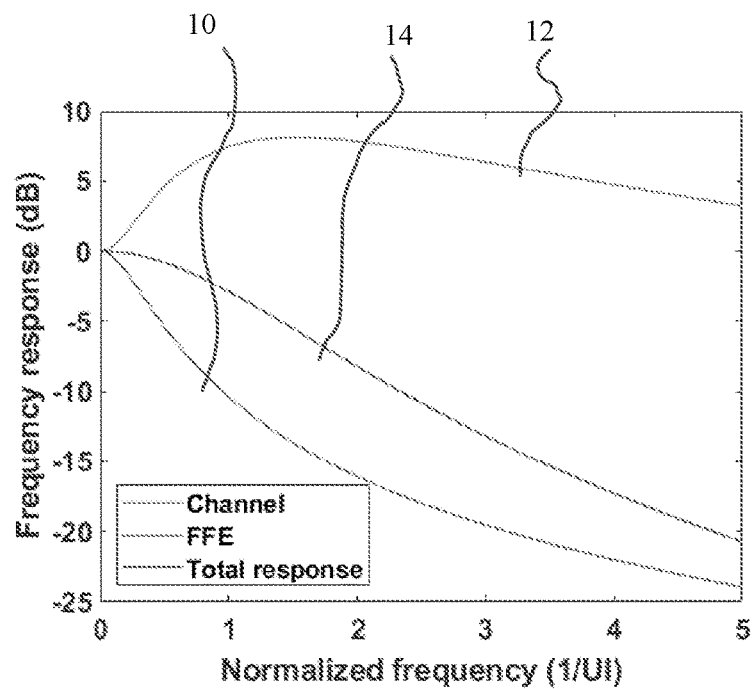
FIG. 3 illustrates the effects of pre-emphasis on the frequency response.

Here $N_i < N$ is the number of "pre-taps", which are taps that have negative time delays with respect to the input waveform. In practice, such negative delays are implemented by including an overall positive delay, which is not indicated in Equation (2), to keep the FFE causal. By analogy, taps with positive time delays are known as "post-taps". The pre-tap and post-tap weights are optimized to implement a high-pass TF that partially compensates for the low-pass behavior of typical wired channels, thereby improving the BER. In the time domain, the high frequency components added by the filter pre-emphasize the data transitions, thus making data decoding at the receiver less error prone. An illustration of the effects of pre-emphasis on the system frequency response is shown in FIG. 3, which plots the frequency response of the channel 10, FFE 12, and combination of the channel and FFE 14 as a function of normalized frequency.

Mathematically, the FFE coefficients are calculated such that convolution with the channel impulse response h(t) results solely in the main cursor, thereby eliminating ISI. For example, a set of linear equations can be used to determine the FFE coefficients in accordance with the following equation.

$$Hc = d \quad (3)$$

Example: 5-tap $FFE(N = 5)$ $$\begin{bmatrix} h_0 & h_{-1} & 0 & 0 & 0 \\ h_1 & h_0 & h_{-1} & 0 & 0 \\ h_2 & h_1 & h_0 & h_{-1} & 0 \\ h_3 & h_2 & h_1 & h_0 & h_{-1} \\ 0 & h_3 & h_2 & h_1 & h_0 \end{bmatrix} \times \begin{bmatrix} c_{-1} \\ c_0 \\ c_1 \\ c_2 \\ c_3 \end{bmatrix} = \begin{bmatrix} 0 \\ 1 \\ 0 \\ 0 \\ 0 \end{bmatrix}$$

In practice, the FFE coefficients are normalized in accordance with the following equation.

$$\sum_{k} |c_k| = 1. \quad (4)$$

This is due to the output voltage swing being limited by power supply headroom. Thus, adding extra taps reduces the weight of the remaining taps, which then attenuates the signal. Since the coefficients are normalized, the following equation holds.

$$c_1 = 1 - \sum_{k=1}^{N-1} |c_k| \equiv 1 - K. \quad (5)$$

Thus, the transfer function becomes $$H(z) = 1 - K + \sum_{k=1}^{N-1} c_k z^{-k}. \quad (6)$$

The maximum high-frequency gain ("boost") occurs when $$z = -1 \Rightarrow \omega = 1/(2\Delta t): \quad (7)$$

$$\frac{H(j\pi)}{H(0)} = \frac{1 - K + \sum_{k=1}^{N-1} c_k (-1)^{-k}}{1 - K + \sum_{k=1}^{N-1} c_k} \leq \frac{1}{1 - 2K}, \, 0 < K < \frac{1}{2}. \quad (8)$$

Using more taps provides a better approximation of the desired frequency response, but does not increase high-frequency gain. In addition, the shunt capacitance of the driver increases approximately linearly with the number of taps, thereby reducing output bandwidth of the line driver. As a result, the achievable eye opening for a given channel is maximized for a particular number of FFE taps, which is denoted by $N_{opt}$.

Figure 4A:
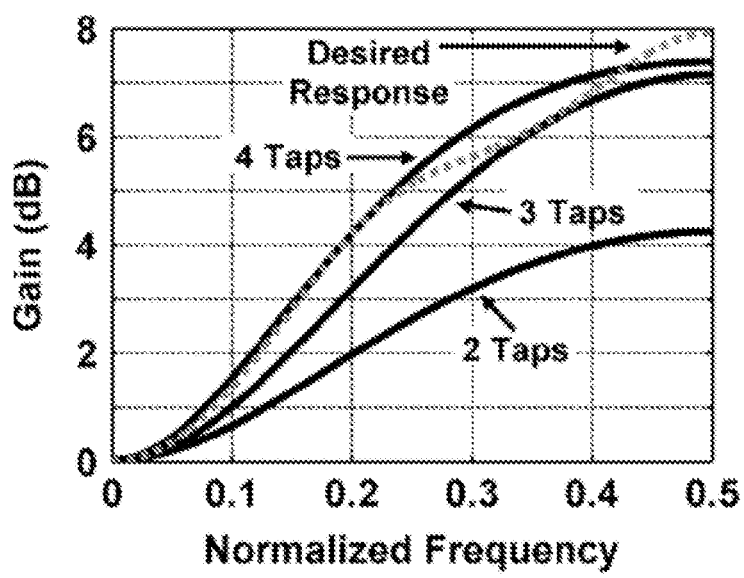
FIG. 4A is a graph of optimized feed-forward equalizer (FFE) transmit gain functions.
Figure 4B:
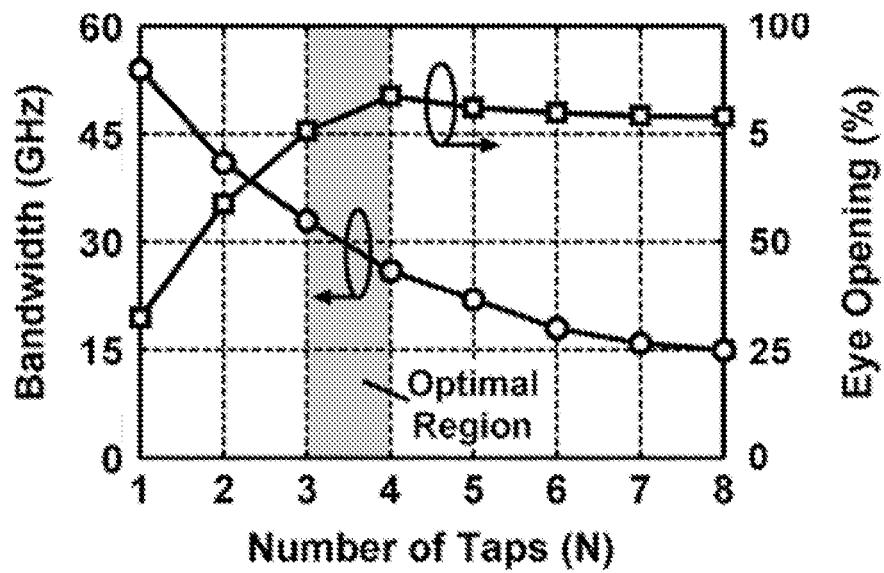
FIG. 4B is a graph of transmitter bandwidth and opening of a received eye diagram as a function of the number of FFE taps.

FIG. 4A shows a graph of optimized FFE transmit gain functions for 2-4 taps, for which the FFE design goal is to compensate for half of the channel loss, that is, inverting the TF of a 20 cm channel. FIG. 4B shows a graph of transmitter bandwidth and opening of the received eye diagram as a function of the number of FFE taps. These graphs provide examples of how pre-emphasis can compensate for the frequency response of the channel. These graphs also confirm that the best performance for a given channel is obtained for an optimum number of FFE taps (denoted by $N_{opt}$).

Figure 5:
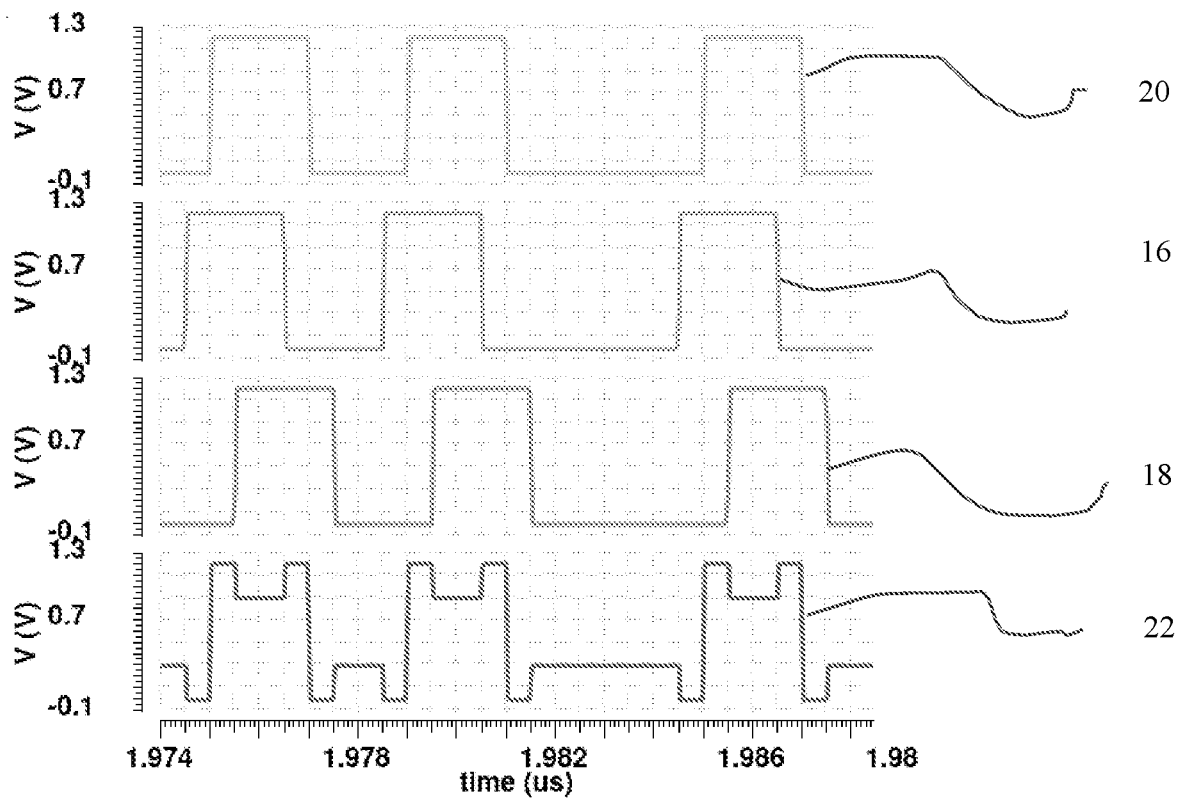
FIG. 5 shows an example of signals generated for pre-emphasis in the time domain.

In the time domain, the effects of pre-emphasis can be understood from the following example. As can be seen in FIG. 5, one pre-tap signal 16 and one post-tap signal 18 are weighted and added to the main tap signal 20 to generate a pre-emphasized output signal 22 with enhanced data transition rates, and thus high frequency content. Stated differently, the additional transitions within the pre-emphasized waveform incorporate high-frequency components to counteract the low-pass filtering effects of the channel. Note that FIG. 5 is independent of the physical method used to construct the resulting signal, that is, either current or voltage arithmetic can be used.

Conventional FFE designs adjust the weights $c_n$ while keeping the delays r fixed to integer multiples of the clock period T (i.e., a duration of one bit, which is commonly denoted by 1×UI where UI represents the unit interval), to simplify the hardware implementation. However, this choice greatly limits the range of waveforms that can be generated by the FFE for a given total number of taps. One or more of the embodiments disclosed herein remove this restriction by allowing both $c_n$ and $\tau_n$ to be programmable by the user. Notably, the value of $\tau_n$ can then be set to fractions of the UI. As a result, one or more of the disclosed embodiments enable utilization of sub-UI delays to enhance edges of the transmission symbols, thereby reducing ISI, while leaving base amplitudes unchanged, thereby saving power. Such asynchronous delays can be realized using asynchronous circuit elements such as current-starved inverters, which are more power-efficient than synchronous ones (such as flip-flops) for small values of $\tau_n$ but are also more sensitive to PVT variations. Fortunately, asynchronous delays can be calibrated to a stable reference, such as the bit rate clock, by using a delay-locked loop (DLL).

Figure 6:
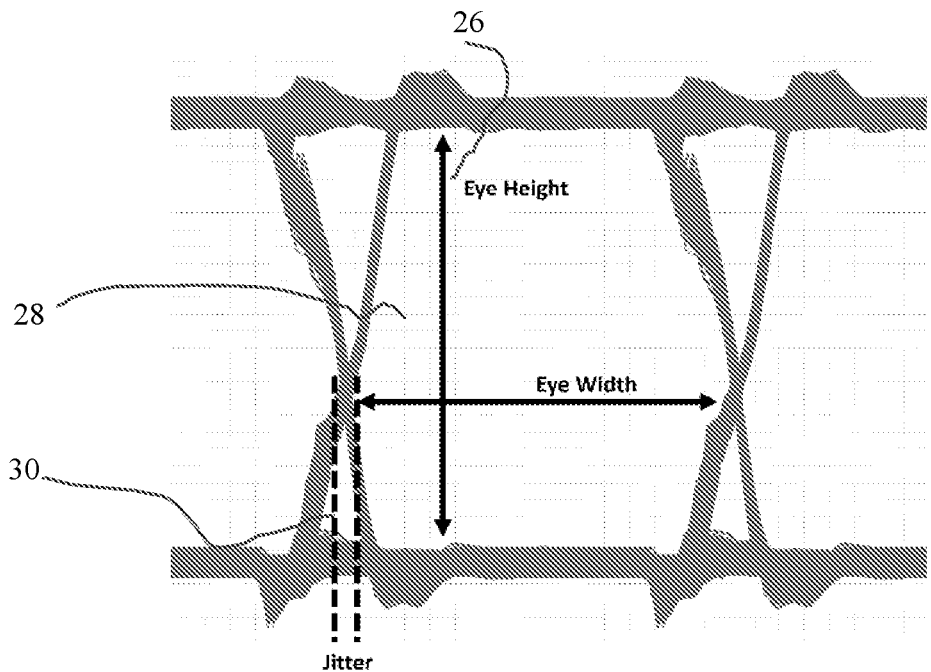
FIG. 6 shows an eye diagram as observed at a receiver.

As the above discussion was directed to a mathematical model of the line driver, the optimum FFE tap settings, which includes the weights $c_n$ and time delays $\tau_n$, that ensure the BER is minimized, will now be discussed. The measured BER generally depends on the bit pattern. To avoid this issue, transmitter performance metrics are derived directly from the measured or simulated eye diagram at the receiver end of the channel. An eye diagram includes all possible bit transitions overlaid on top of each other, which ensures that the extracted metrics are independent of the bit pattern. FIG. 6 shows a typical eye diagram for binary data with the parameters labeled. These parameters can be formally defined. Specifically, eye height 26 is defined as the steady-state voltage difference between a logic 1 and a logic 0. Eye width 28 is defined as the minimum time delay between adjacent bit transitions. Jitter 30 is defined as the amplitude and timing uncertainty in the voltage levels and bit transition instants, respectively. The two primary types of jitter include random jitter, which is defined as the gaussian-distributed waveform variability due, for example, to thermal noise in the circuit, that cannot be predicted, and deterministic jitter, which is defined as predictable and repeatable waveform variability that is, for example, due to power supply ripple or signal crosstalk.

These eye diagram parameters allow the user to determine how well the line driver is transmitting data over a specified channel. For example, the area of the eye opening, which is defined by the following equation, $$\text{Eye Opening} = \text{Eye Height} \times \text{Eye Width} \quad (9)$$

can be used as a bit pattern-independent performance metric or figure of merit (FOM). These empirical metrics are useful since different cable configurations and/or loads cause changes in reflection coefficients, attenuation, and transmission delay that affect the eye diagram in complex ways. Due to these effects, which are difficult to model, as well as higher order effects, such as crosstalk, it is difficult to theoretically predict the driver settings that optimize BER for a specific data rate and channel. Thus, these settings are derived by maximizing empirical metrics, such as eye opening, that can be readily measured, in one or more of the disclosed embodiments.

Figure 7:
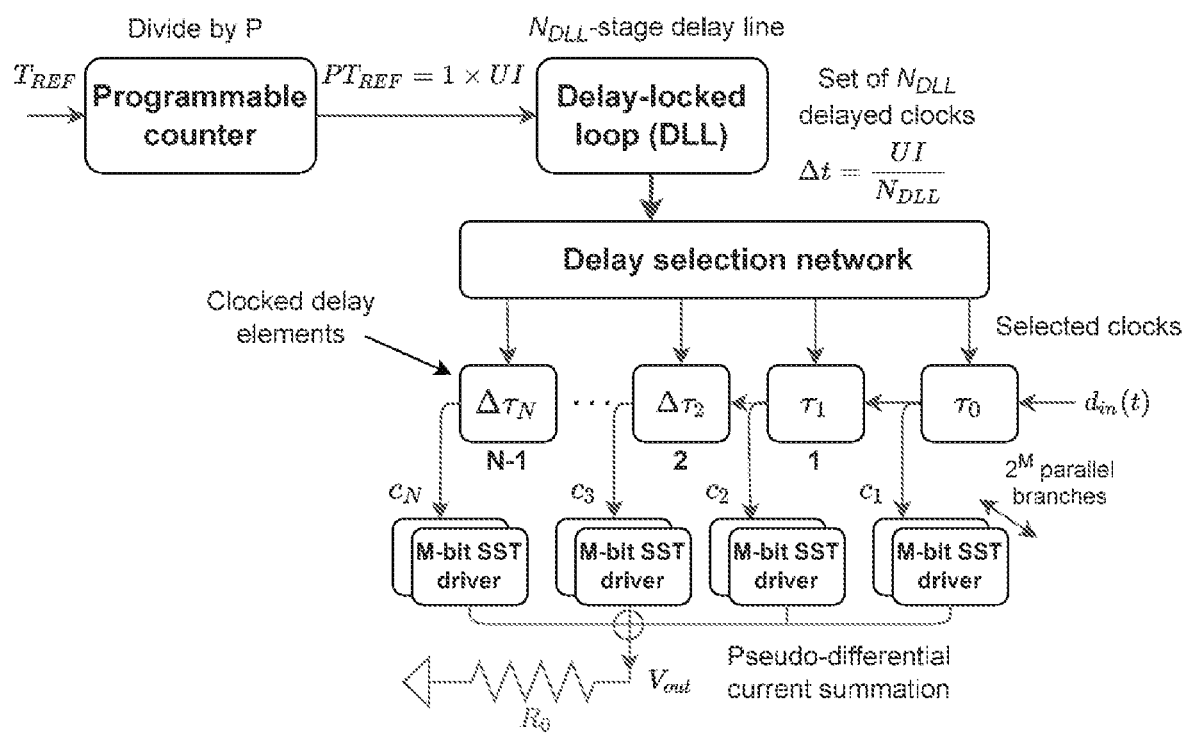
FIG. 7 is a top-level block diagram of an adaptive line driver in accordance with one or more embodiments disclosed herein.

FIG. 7 shows a top-level block diagram of a user-configurable or adaptive line driver architecture in accordance with one or more embodiments disclosed herein. The line driver uses an N-tap FFE to compensate for channel loss due to different cable configurations (e.g., N=5), and pseudo-differential SST drivers to reduce power consumption. Each driver provides M-bit control of output amplitude, and thus the FFE coefficients, by turning "on" up to $2^M$ SST driver branches (e.g., M=4). The line driver also provides two levels of control over FFE time delays, which include coarse adjustment using a programmable counter and fine adjustment using a DLL-stabilized voltage- or current-controlled delay line. Specifically, the line driver generates asynchronous delays by (1) scaling up the system reference clock period TREF=UI/P by an integer factor P by using the programmable counter, and (2) generating fine time intervals by using the on-chip delay-locked loop (DLL). Note that the DLL stabilizes the asynchronous delays, such that the line driver is capable of reliable operation in high-radiation and/or cryogenic environments.

The DLL outputs are then fed into a delay selection circuit that uses a network of switches to select the set of time delays $\tau_n$ acting on the input data signal $d_{in}(t)$. To simplify the implementation, the data signal is cumulatively delayed by a series of clocked delay elements (e.g., D-type flip-flops) that are clocked using the selected delayed clocks from the DLL. As a result, the delay of the $n^{th}$ element is set to $\Delta\tau_n = (\tau_n - \tau_{n-1})$ as shown in FIG. 7. Also, an initial delay of $\tau_0$ is added to keep the FFE causal. The delayed data signals control the SST driver arrays to create pre-emphasis, and the driver array outputs are summed together to generate the output current $I_{out}$. Finally, the latter is converted to the output voltage $V_{out}$ by a load resistor $R_0$. Note that while only a single-ended output voltage $V_{out}$ is shown in FIG. 7 for simplicity, the actual output waveform is pseudo-differential.

Figure 8A:
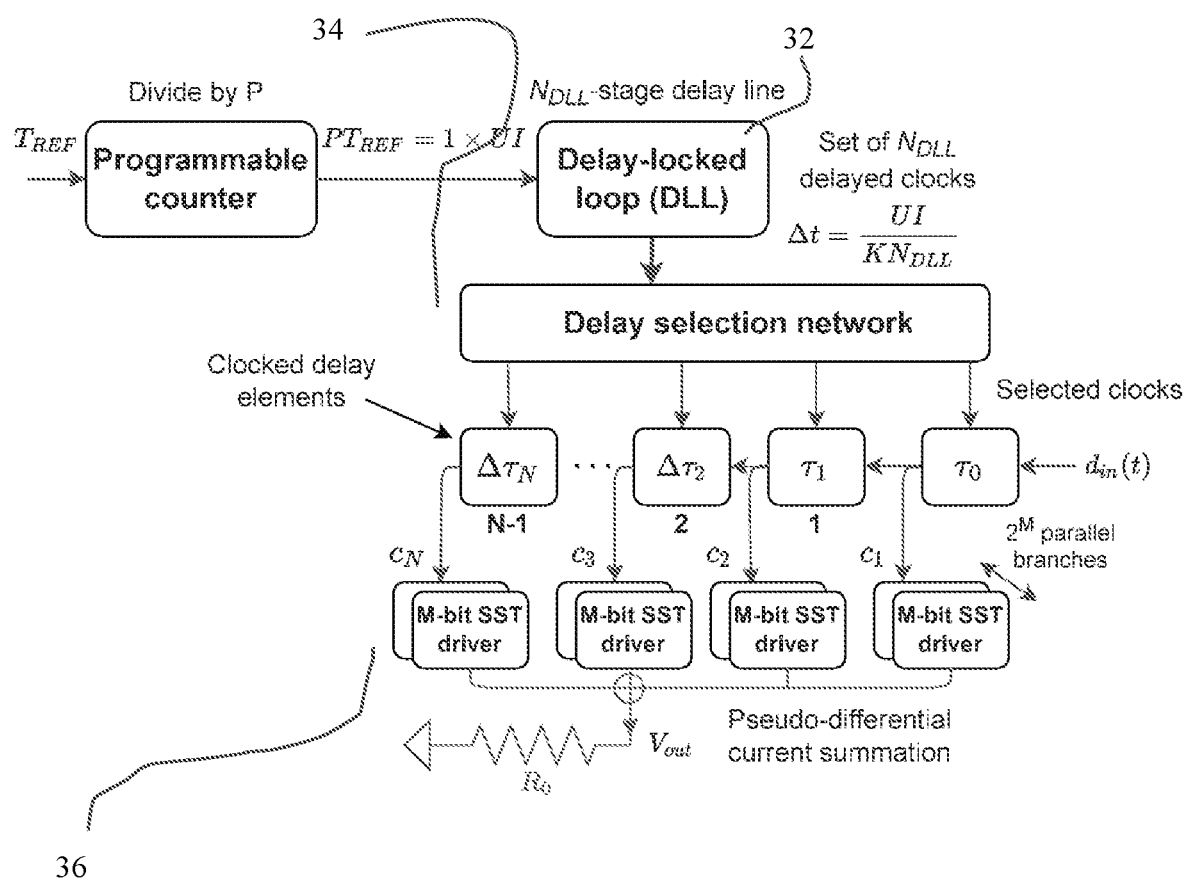
FIG. 8A is a top-level block diagram of an adaptive line driver in accordance with one or more embodiments disclosed herein where K-fold digital interpolation is used to increase the timing resolution of the DLL outputs by a factor of K.

FIG. 8A shows a top-level embodiment of the line driver architecture, in which K-fold digital interpolation is used to increase the timing resolution of the DLL outputs by a factor of K>1. Performance specifications of one embodiment of such a line driver may include waveform programmability of UI/16, date rates up to 2 Gb/s, DLL power at 0.5 Gb/s of 2.4 mW, and driver power of 3 mW. For the purpose of illustration, an embodiment that realizes a three-tap FFE (N=3 and $N_i=1$), thus resulting in one main tap, one pre-tap, and one post-tap, is now discussed. However, this architecture can be extended to other values of N and $N_i$. Both the weights $c_n$ and time delays $\tau_n$ of the three taps are programmable, thereby enabling the circuit to generate pre-emphasized output waveforms having a general shape shown in FIG. 9. This shape can be characterized by five programmable parameters, which are denoted by a, b, c, d, and e. It is to be noted that previous FFE designs, including those with larger values of N, do not allow the timing parameters a and b to be programmed, and are thus limited to a much smaller subset of output waveforms than that generated by one or more of the embodiments disclosed herein.

Figures 8B, 8C, 8D:
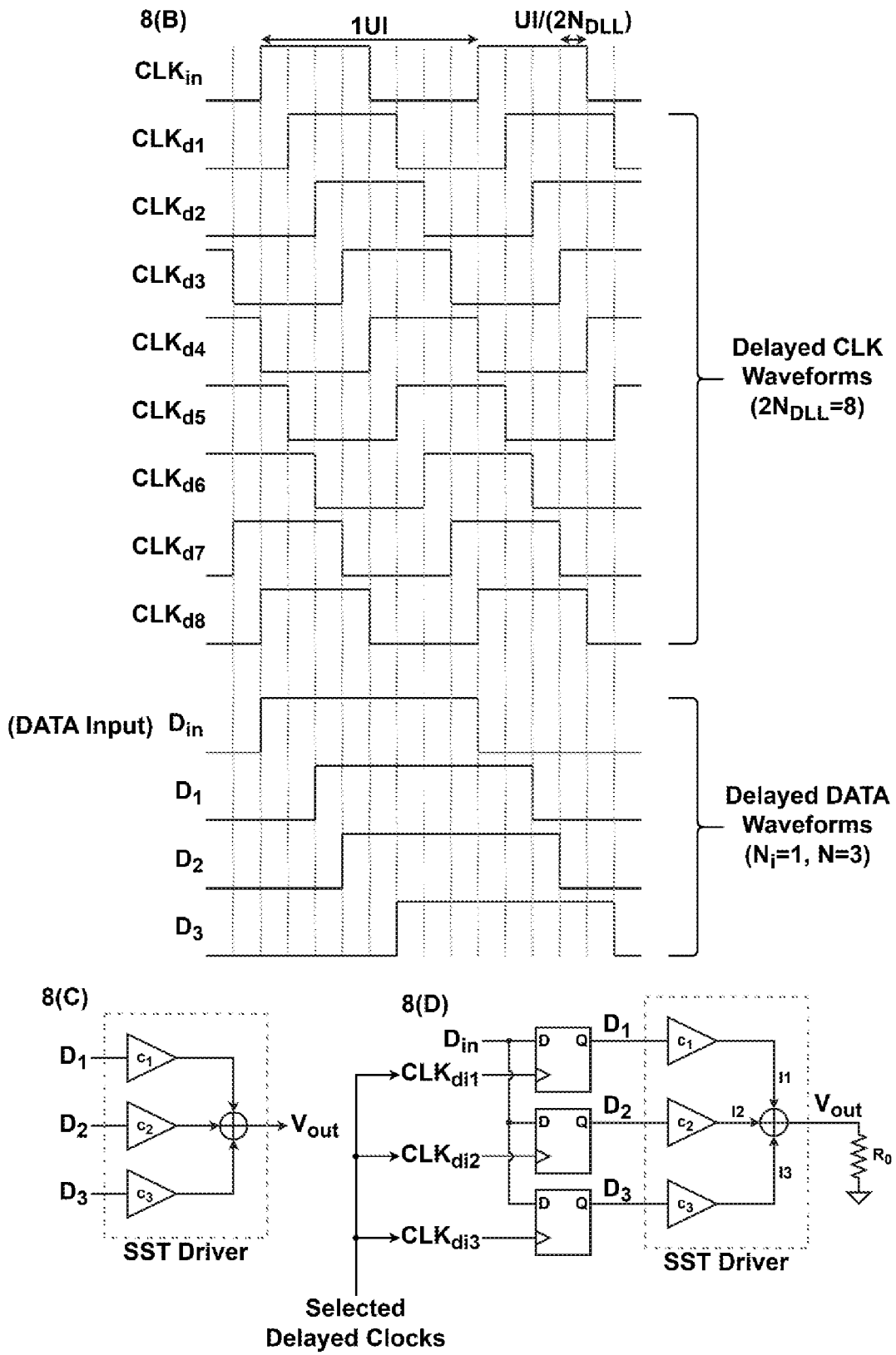
FIGS. 8(B)-8(D) show typical waveforms for the line driver shown in FIG. 8A.

FIG. 8(B) discloses typical waveforms for the line driver architecture shown in FIG. 8A. Specifically, FIG. 8(B), subplot (1), shows a set of $2N_{DLL}=8$ delayed clock waveforms CLKd$_i$ (where i={1, 2, . . . , 8}) that are generated by the DLL from the input clock CLK. It also shows a set of N=3 delayed data waveforms $d_j$ (where j={1, 2, 3}) that are generated from the input data waveform $d_{in}$ using clocked delay elements, as shown in FIG. 8A. Subplot FIG. 8(C), shows that the SST driver generates the output voltage waveform $V_{out}$ as a weighted summation of the delayed data waveforms $d_j$. Note that while only a single-ended output voltage $V_{out}$ is shown in FIG. 8(B) for simplicity, the actual output waveform is pseudo-differential. Subplot FIG. 8(D), shows the process of generating the delayed data waveforms $d_1$ in more detail. Each waveform is generated by a D-type flip-flip that is triggered on the rising edge of a specific delayed clock waveform CLKd$_k$, where the value of k={1, 2, . . . 8} is determined by the delay selection network shown in FIG. 8A.

Figure 9:
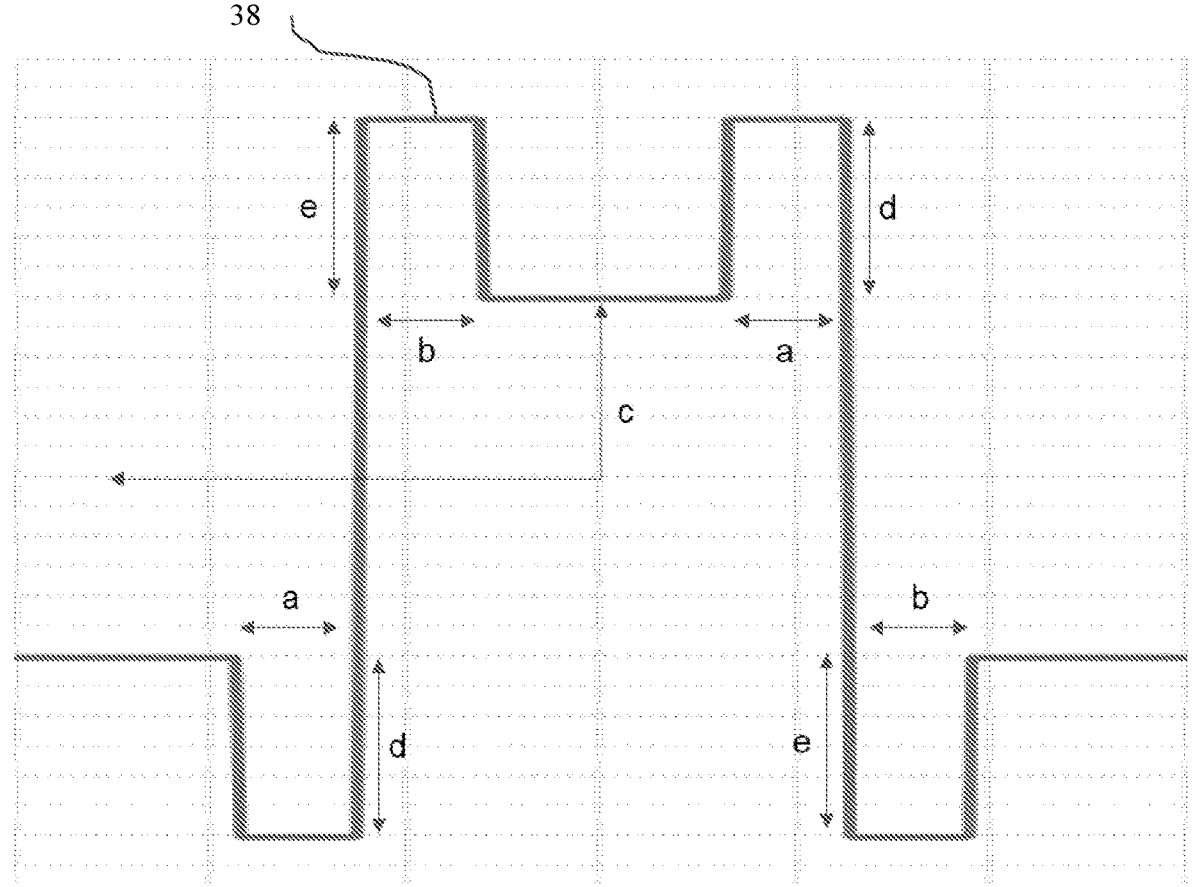
FIG. 9 shows a pre-emphasized output waveform with user-configurable parameters.

FIG. 9 shows the general shape of a single bit after manipulation using three pre-emphasis taps, including 1 pre-data tap, 1 main-data tap, and 1 post-data tap (i.e., for N=3 and $N_i=1$). The pre-data and post-data taps may be referred to as positive or negative "devil's horns" based on the polarity of the specific tap. The pre-data tap is responsible for spikes that occur prior to an edge transition, the post-data tap is responsible for spikes that occur after an edge transition, and the parameters are adjustable to find the optimal pre-emphasis settings to drive a particular cable. Parameter a represents the duration of pre-emphasis prior to edge transition (pre-tap duration), parameter b represents the duration of pre-emphasis after an edge transition (post-tap duration), parameter c represents a normal logic level without pre-emphasis (no pre-emphasis); parameter d represents the pre-emphasized level prior to edge transition, and parameter e represents the pre-emphasized level after edge transition. As an example, for a high-loss flexible Taiflex™ cable, the following optimal settings for parameters were found: a=0.1×UI, b=0.9×UI, and c=d=e=0.5×$V_{DD}$. These optimal values were found by varying a and b in steps of 0.1×UI, and c, d, and e in steps of 0.1×$V_{DD}$, respectively. Thus, to set parameters a and b, the driver should be able to generate pulse widths of the form j×0.1×UI where j is an integer from 1 to 10. Similarly, to set parameters c, d, and e, the driver is able to generate pulse heights of the form k×0.1×$V_{DD}$ where k is an integer from 1 to 10.

The block diagrams in FIGS. 7 and 8A show the main circuit components of one implementation of the line driver, which are a delay-locked loop (DLL) 32, a data-retiming circuit 34 (consisting of the delay selection network and clocked delay elements), and N independent arrays of M-bit SST drivers 36.

Figure 10:
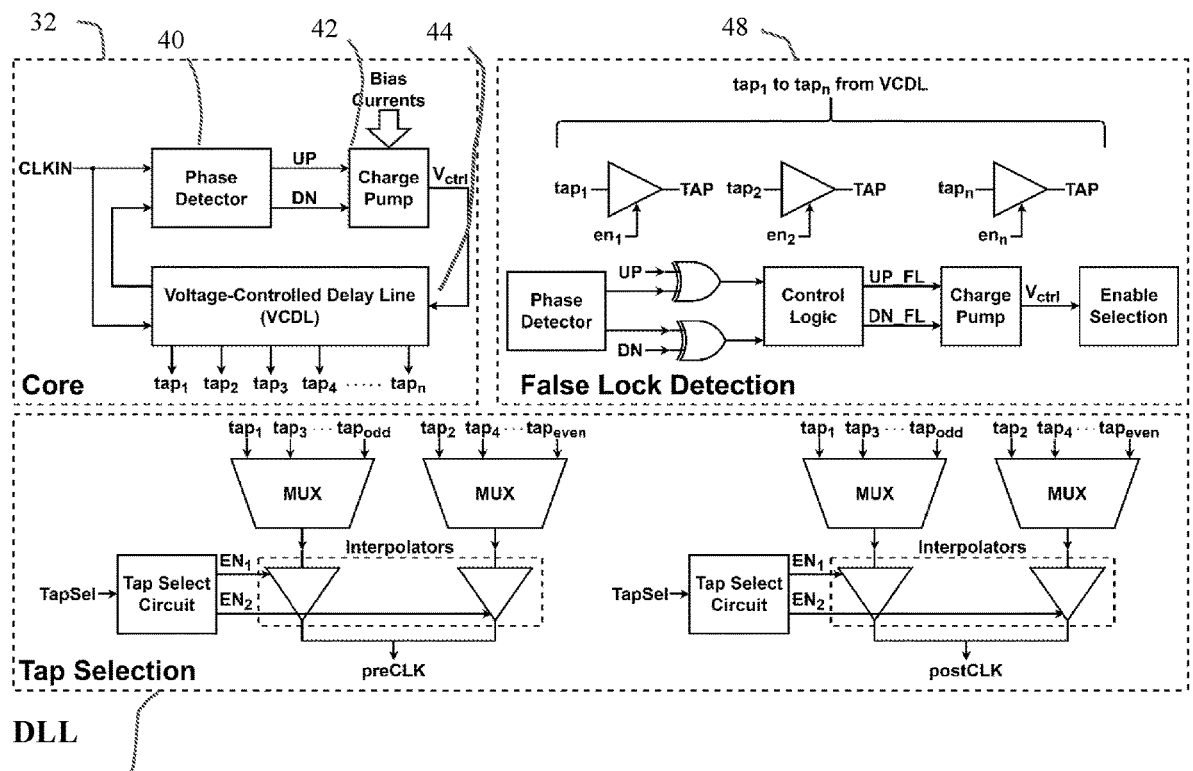
FIG. 10 is a block diagram of a delay-locked loop (DLL) circuit.

The DLL 32 uses the system clock as its input and also accepts several user-defined configuration parameters, including DC bias currents for the charge pump (CP) and voltage-controlled delay line (VCDL). The DLL is shown in more detail in FIG. 10. It utilizes a VCDL with $N_{DLL}$ taps to produce $N_{DLL}$ replicas of the clock with a relative delay of UI/$N_{DLL}$, where UI is the clock period. Consider the block diagram of the DLL 32 shown in FIG. 10. The DLL core 32 uses a negative feedback loop to generate pre- and post-tap delays that are stable with respect to PVT variations. In particular, the DLL utilizes a phase detector (PD) 40 and charge pump (CP) 42 to control the time delay of the VCDL 44. For this purpose, the PD 40 generates two phase error signals, which are denoted as UP and DN and are integrated by the CP 42, to generate the VCDL 44 control voltage, which is denoted by $V_{ctrl}$. In addition, the tap selection block in FIG. 10 allows the user to either select a single tap or to mix two adjacent taps using a digital interpolator circuit. The latter allows the user to choose either a single tap or to "mix" adjacent taps, thereby producing an output time delay that is equal to, for example, an average of the two taps. As seen in the tap selection block 46 of FIG. 10, two adjacent tap outputs, which are denoted by tap$_X$ and tap$_{X+1}$, are interpolated to generate a signal midway between the two VCDL taps, thereby increasing flexibility by doubling the number of delay choices available to the user. Thus, the user can choose one of $2N_{DLL}$ interpolated taps to generate the time-shifted clock for the pre-tap clock signal, which is denoted by preTapCLOCK, and the post-tap clock signal, which is denoted postTapCLOCK. This approach doubles the effective number of delayed clock signals (thus implementing an interpolation factor of K=2), which in turn further improves the timing resolution of the FFE to $UI/2N_{DLL}$.

As described previously, the user programs the delay selection network to select one of the $2N_{DLL}$ interpolated replica clock waveforms to realize each tap delay $\tau_i$. The available delay values are given by $n(UI/2N_{DLL})$ where n can range from 1 to $2N_{DLL}$. The chosen delayed clock waveforms are then fed into the data-retiming circuit 34 that inputs the data and outputs N time-shifted versions of the data based on the delayed clocks, thus generating the pre-data and post-data signals. The retiming circuit 34 samples an incoming stream of symbols generated by the transmission clock by latching the stream states using the delayed clocks provided by the DLL 32. Typically, the retiming circuit 34 uses edge sensitive sequential logic elements (such as D-type flip-flops) as shown in FIG. 8B, but can also be developed using, for example, Muller C-elements and/or hysteresis flip-flops. In either case, the result is a family of delayed data waveforms, such as those shown in FIG. 8(B). The streams created by the data retiming circuit 34 are synchronous to the clock by which data is sent, but are shifted in phase. Recovering data from the resulting output waveform requires appropriate phase adjustment on the receiver side. These phase adjustments, which are necessary for optimally sampling the received data stream, can be made by searching for the phase that minimizes the BER. The receiver can continuously monitor the BER of the link for this purpose.

FIGS. 11(A)-11(C) disclose an alternative implementation of the line driver architecture that does not use clocked delay elements to retime the input data waveform $d_{in}(t)$. This implementation is expected to be more energy-efficient but at the cost of higher timing jitter in the output waveform. In this implementation, $d_{in}(t)$ is delayed using a matched copy ("replica") of the main VCDL within the DLL, as shown in FIG. 11(A), subplot (1). Both VCDLs can use interpolation to increase their output timing resolution, as described previously. A tap selection network (consisting of a set of switches) selects N of the $KN_{DLL}$ available delayed data waveforms, where N is the number of taps and K is the interpolation factor. These selected waveforms are denoted by $d_j$, where j={1, 2, 3} in the example shown in the figure. A set of logic gates, as shown in FIG. 11(B), subplot (2), then generates driver control signals A, B, C, and D from the selected delayed data waveforms $d_j$. These signals have pulse widths corresponding to the timing parameters a and b in the general output waveform shown in FIG. 9. Finally, the driver control signals are used to enable/disable individual branches of the SST driver with corresponding branch weights $w_k$, where k={1, 2, . . . , 5}, to generate the output waveform $V_{out}$ as shown in subplot, FIG. 11(C). Note that while only a single-ended output voltage $V_{out}$ is shown in FIGS. 11(A)-11(C) for simplicity, the actual output waveform is pseudo-differential.

The negative feedback loop used by the DLL reaches steady-state conditions (known as a locked state) once the final tap of the VCDL 44 is time-aligned with the clock input, which implies that the VCDL 44 has a time delay of one clock cycle (denoted by 1×UI). Thus, in the absence of mismatches between the VCDL delay elements, each element within the VCDL 44 generates a steady-state delay in accordance with the following equation:

$$D = UI * \frac{\text{stage}}{N_{DLL}}. \tag{10}$$

Figure 12:
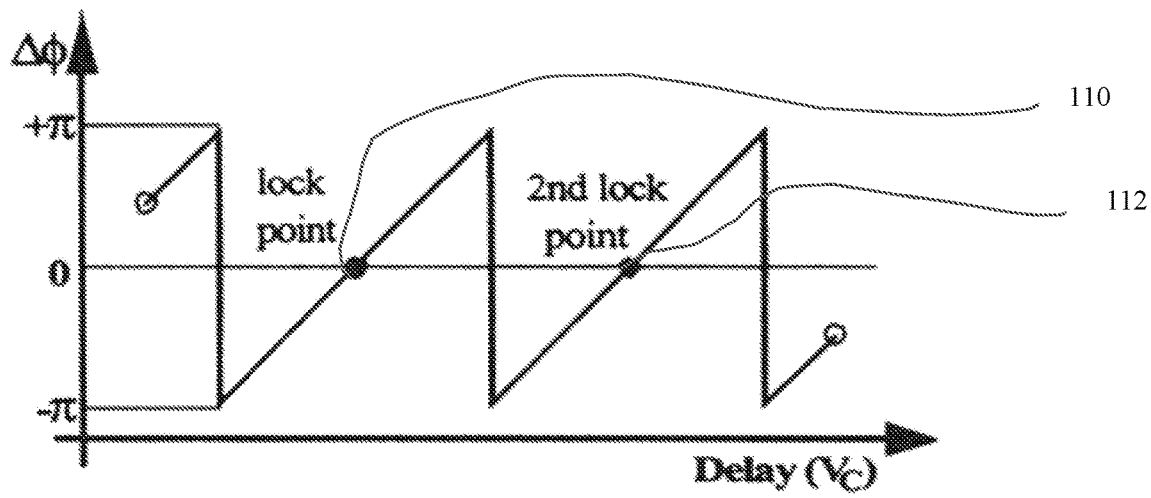
FIG. 12 illustrates a false locking condition for the DLL.

In Equation (10) above, D represents the delay of each tap, stage=[1, 2, . . . , $N_{DLL}$] is the tap number, $N_{DLL}$ is the total number of taps, and UI is the unit interval, which is equal to the clock period. The DLL 32 includes an additional circuit to ensure that the total delay of the VCDL 44 is one clock cycle (1×UI) in the locked state, as assumed in Equation (10), rather than some other integer multiple of UI; the latter is referred to as a false lock condition. False locking is a phenomenon arising with DLLs in which an output of the delay initializes at a delay greater than one UI, and thus locks to a delay of n×UI where n is an integer greater than 1. Fundamentally, this condition is caused by an average output voltage of the PD 40 being a periodic function of the phase difference between its inputs, typically with a period of $2\pi$, which corresponds to a time delay of 1×UI. For example, in the graph of FIG. 12, this concept is illustrated by DLL locking at the $2^{nd}$ lock point 112 whereas, ideally, the DLL should have locked at the first lock point 110. This error causes the pre-emphasis taps to malfunction. This is because when the output locks at a delay n×UI, each VCDL element, which originally had a delay of D, now has a larger delay of n×D.

Such unwanted false locks can occur when the VCDL 44 delay transiently exceeds 1×UI due to, for example, a temperature change. The line driver flags such a false lock by testing each of the internal VCDL 44 taps (taps 1-7) once the system locks. The false lock detection circuit 48 is an inherent part of the line driver since it ensures that the granularity of the pre-tap and post-tap delays is minimized, that is, false lock detection circuit 48 prevents the number of available delays from being divided by n>1 when the total VCDL delay is n×UI at a false lock point. The goal is to verify whether any of the tap waveforms results in a PD 40 output that matches the PD 40 output of the DLL 32. In this case, the internal tap must have a delay of 1×UI, which indicates a false lock condition. If none of the taps indicate the false lock condition, the circuit is designed to shutdown to save power and is turned on when the DLL 32 is reset.

The delayed clock signals outputted by the DLL 32 are utilized to re-time the data that is aligned with the system clock, thereby creating a pre-data signal and a post-data signal. Each of these three signals feeds its own independent driver, whose outputs are tied together. The summation of these three driver outputs results in the general pre-emphasized shape shown in FIG. 9.

Figure 13:
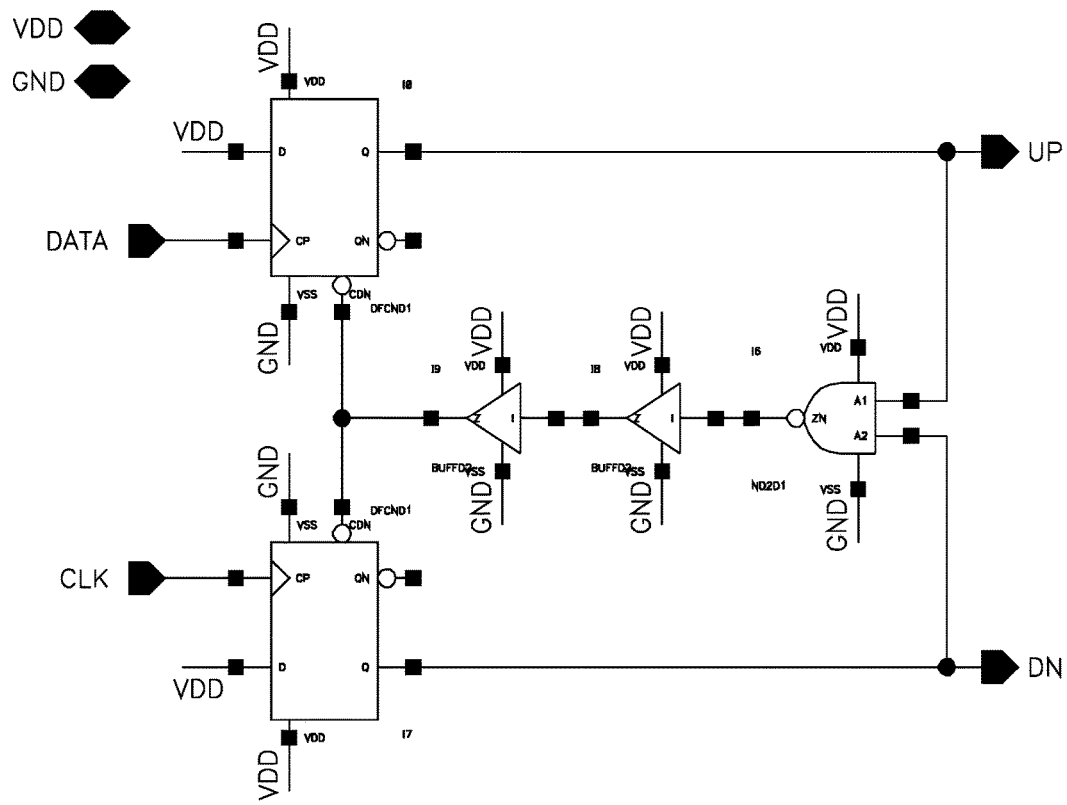
FIG. 13 is a schematic diagram of an embodiment of a phase detector circuit used in the DLL circuit.

FIGS. 13-16 show transistor level implementations of the line driver DLL circuit using a target clock frequency of 500 MHz (such that UI=2 ns) in accordance with one or more embodiments disclosed herein. FIG. 13 shows a schematic diagram of an embodiment of a phase detector circuit used in the DLL circuit. Time delay is added in the reset path to ensure that the setup time requirements of the flip-flops are satisfied.

Figure 14:
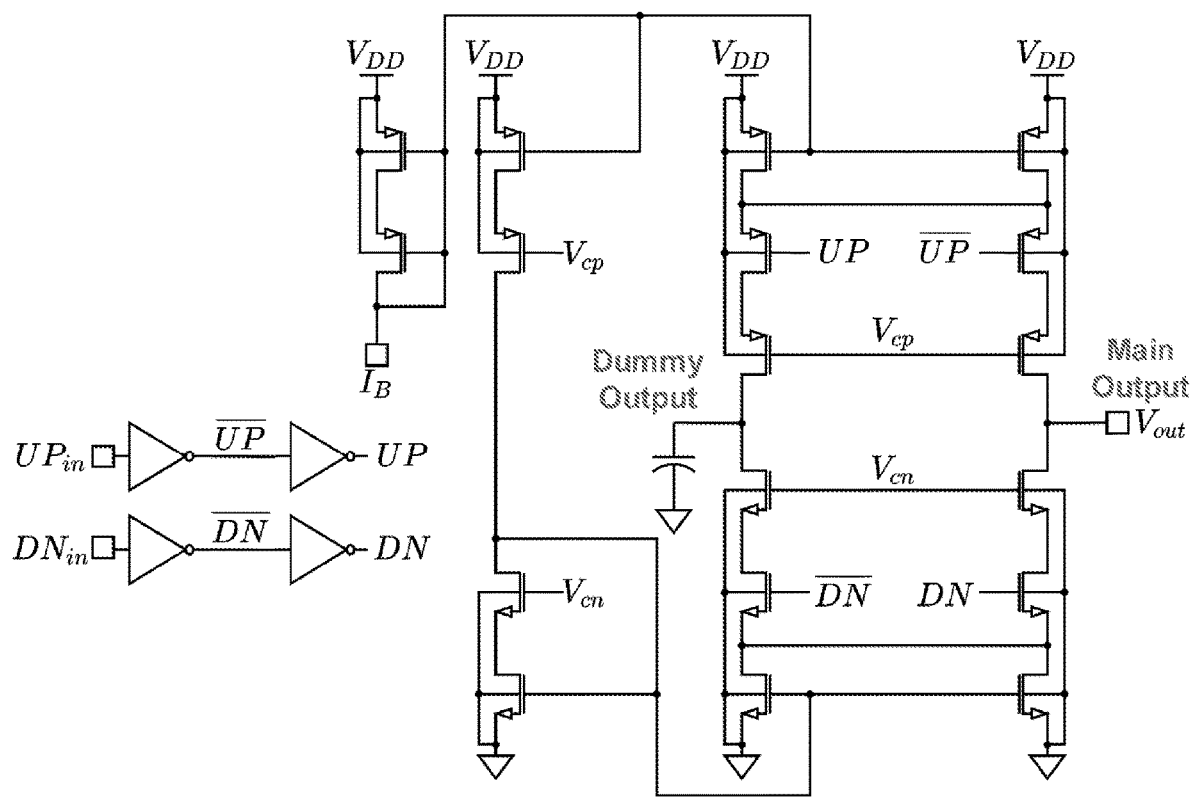
FIG. 14 is a schematic diagram of an embodiment of a charge pump circuit used in the DLL circuit.

FIG. 14 shows a schematic diagram of an embodiment of a charge pump circuit used in the DLL circuit. Cascaded current sources are used to improve linearity. Differential switching is used to reduce charge injection errors.

Figure 15:
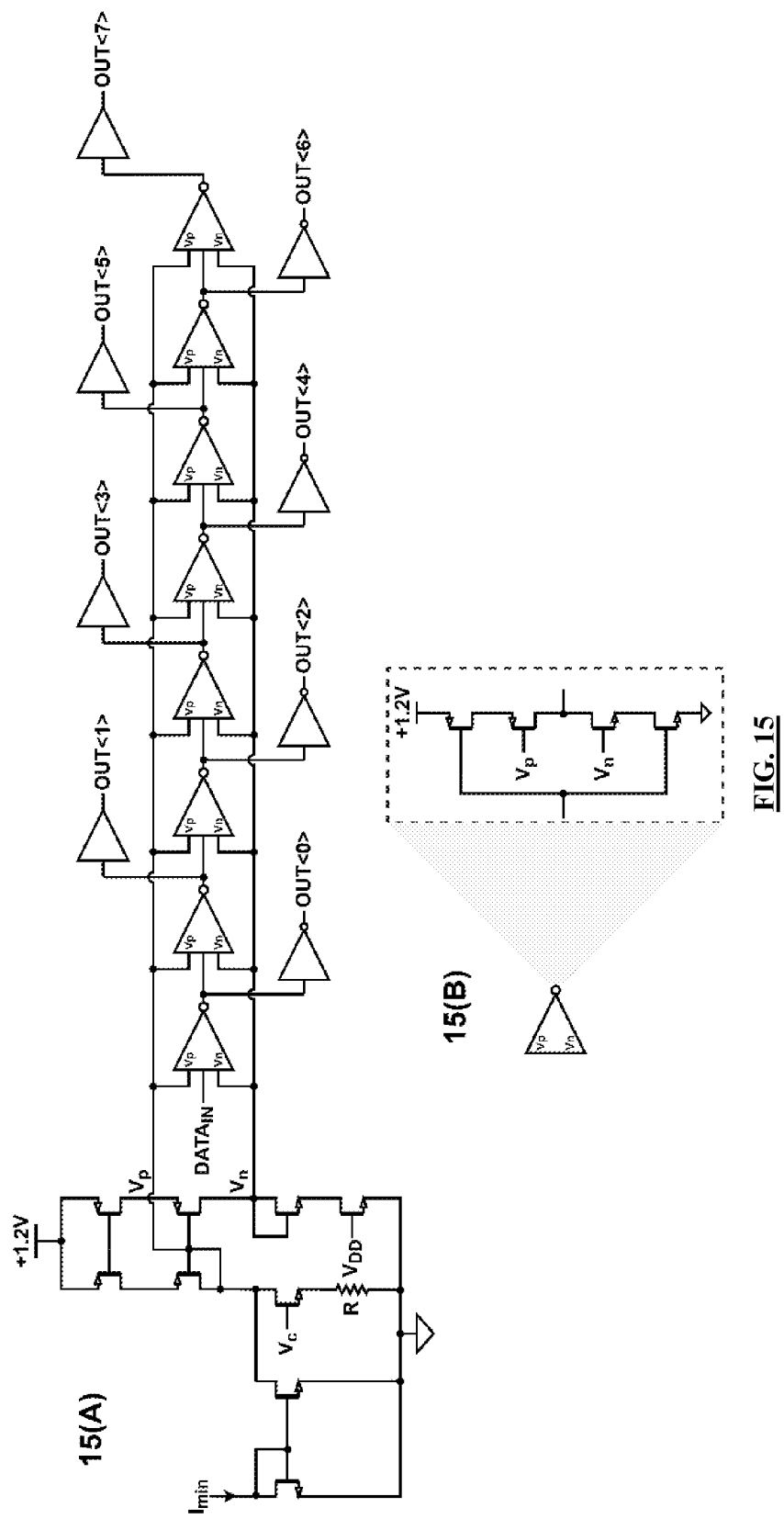
FIG. 15 is a schematic diagram of an embodiment of a voltage-controlled delay line circuit used in the DLL circuit.

FIG. 15 shows a schematic diagram of an embodiment of a voltage-controlled delay line circuit used in the DLL circuit. An offset current $I_{min}$ is added to linearize the input voltage-current conversion. Alternate outputs are inverted, thereby allowing each of the N outputs to be used for generating time delays.

Figure 16:
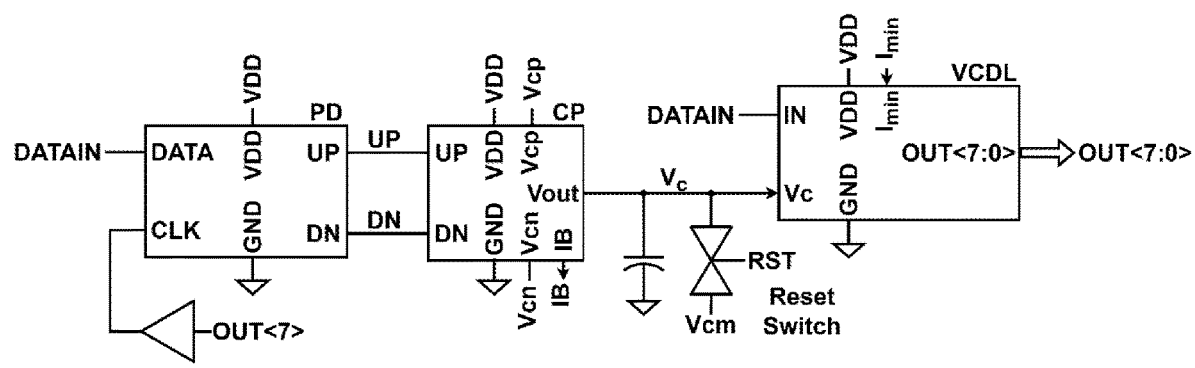
FIG. 16 is a block diagram of an embodiment of the DLL circuit.

FIG. 16 shows a block diagram of an embodiment of the DLL circuit. Loop filter capacitance is equal to 1.6 pF, which is implemented as a metal-oxide-metal (MOM) capacitor. Nominal charge pump bias current is equal to 10 μA. A reset switch is incorporated in the DLL circuit to initialize the charge pump output voltage ($V_c$) to a DC voltage $V_{CM}$, the value of which is chosen to avoid false lock points. Transient simulation results at $V_{CM}$ equal to 0 V and 0.6 V indicate that the DLL circuit can determine a correct lock point in approximately 150 ns or 75 clock cycles. In addition, the DLL circuit is able to detect and correct for false lock points where the VCDL delay is half of its desired value of 1×UI. At such false lock points, the phase detector outputs are not balanced; however, a lock point is nevertheless found if $V_c$ becomes high enough to push the high-side charge pump current sources out of saturation.

Figure 17:
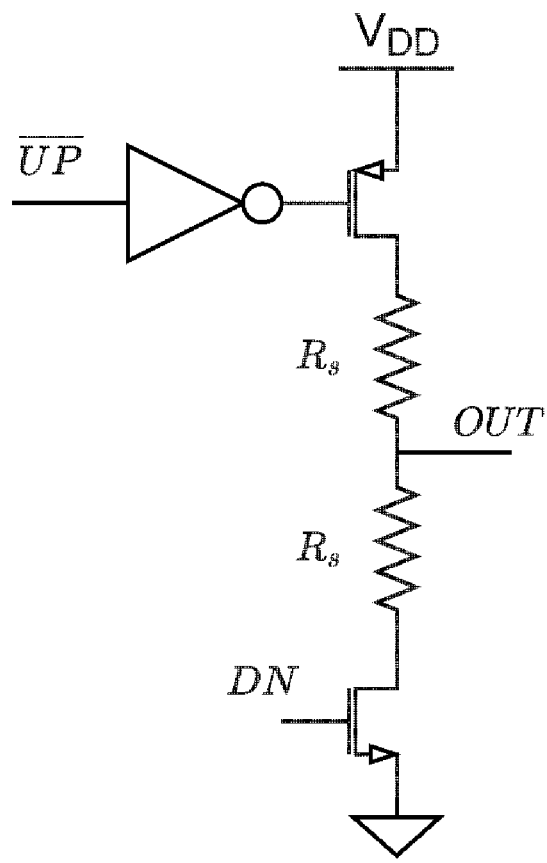
FIG. 17 is a schematic of a single branch of a source-series terminated (SST) driver circuit.

The main data, pre-data, and post-data signals generated by any of the driver implementations shown in FIGS. 7, 8A, 8(B)-8(D), and 11(A)-11(C) are fed into their own respective SST driver arrays 36. Each SST driver branch resembles a source-degenerated totem-pole circuit, as shown in FIG. 17. The transistors are operated as switches to allow operation at a lower $V_{DD}$, thereby saving power, while the source resistors $R_s$ linearize the response and set output impedance. The advantages of this solution include a significant reduction in analog power consumption and improved output bandwidth due to lower output capacitance than current-mode drivers. The disadvantages include amplitude-dependent output impedance of the driver, which is a function of the quantity of parallel SST branches, thereby making the input-output response of the driver nonlinear. Also, the output, which uses two complementary drivers, is pseudo-differential, which degrades the common-mode rejection ratio.

An example of a single branch of the SST line driver circuit is shown in FIG. 17. The input signals, which are denoted as $\overline{UP}$ and DN in FIG. 17, are connected to a single bit of the weight signal for each tap, such that the FFE weight is equal to the number of parallel SST drivers that are enabled (either UP or DN is logic "high") while the others are disabled (both UP and DN are logic "low").

As discussed above, the user can program the tap weights by selecting the number of parallel-connected SST drivers within the arrays that are enabled at any given time. By doing so, the user can configure parameters c, d, and e according to FIG. 9 based on the number of parallel drivers for the pre-tap, main-tap and post-tap, respectively. Finally, the outputs of these three drivers 36 are tied together, which sums their output currents to generate a desired pre-emphasized transmit waveform 38 as shown, for example, in FIG. 7. The termination resistance $R_0$ determines voltage swings of the signals at the input of the transmission line.

Figure 18:
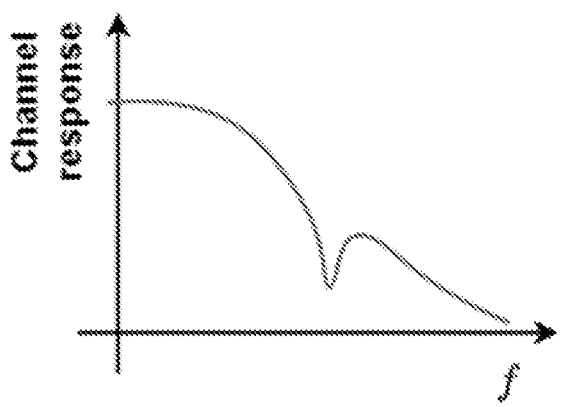
FIG. 18 illustrates a channel transfer function (TF) that contains narrowband features caused by signal reflections at impedance discontinuities.

In addition to slowly-varying frequency-dependent loss, the channel transfer function (TF) can include narrowband features, which include peaks and nulls, due to reflections from impedance discontinuities, as shown in FIG. 18. These narrowband features can significantly degrade ISI. A common source of reflection is mismatch between the channel, which can be modeled as a transmission line with impedance $Z_0$, and transmitter/receiver circuits, which can be modelled as source/load impedance of $Z_S$ and $Z_L$, respectively. Thus, the source and load reflection coefficients are provided in accordance with the following equations:

$$\Gamma_S = \frac{Z_S - Z_0}{Z_S + Z_0}, \Gamma_L = \frac{Z_L - Z_0}{Z_L + Z_0} \tag{11}$$

and thus the amplitude of a reflected signal after one round trip is $$\propto \Gamma_S \Gamma_L H^2(f). \tag{12}$$

Reflected signals can be eliminated by impedance matching either the source, which results in $\Gamma_S=0$, or the load, which results in $\Gamma_L=0$. For a high-loss channel, in which $|H(f)|\ll 1$, impedance matching is not required to eliminate reflections, and an impedance-mismatched driver circuit can be used to reduce power and/or maximize the received signal-to-noise ratio (SNR). For example, this design uses parallel-connected arrays of SST drivers, which save power at the cost of weight-dependent impedance mismatch and output voltage swing.

Figure 19A:
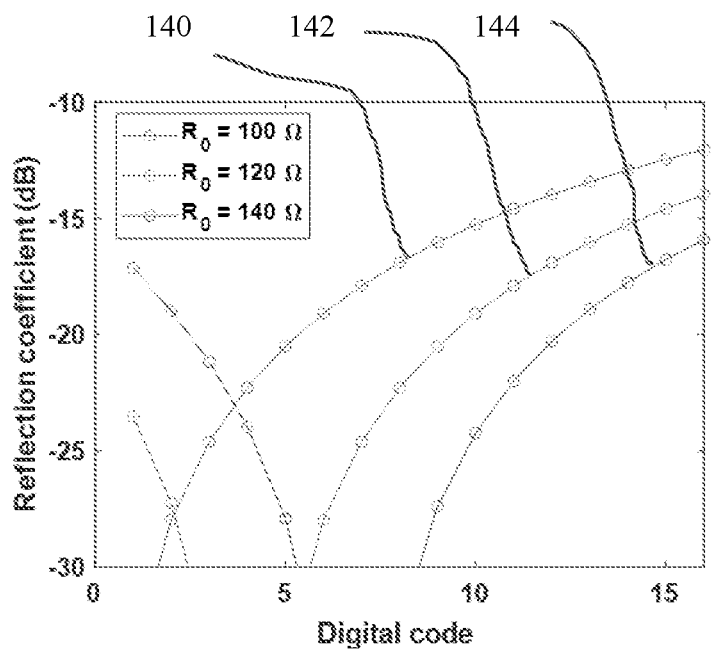
FIGS. 19A-19B provide simulated reflection coefficient and output voltage swing of an SST driver as a function of the FFE weight (digital code) at three different termination impedances.
Figure 19B:
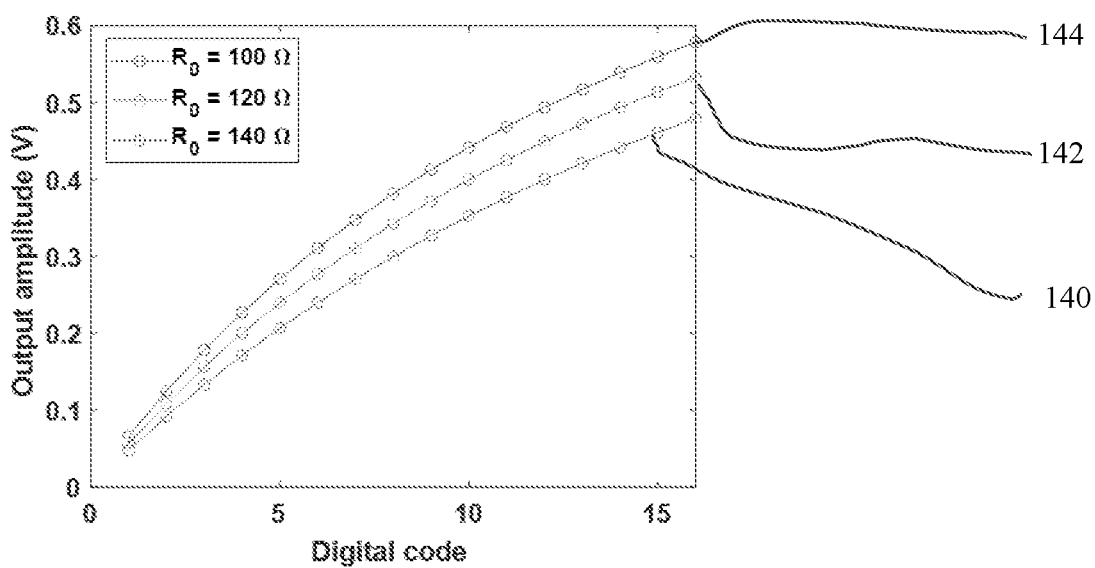

Consider an M-bit SST transmitter that includes $2^M$ parallel unit cells. FIGS. 19A-19B summarize the simulated reflection coefficient $|\Gamma_S|$ and output voltage swing, respectively, of this transmitter for various signal weights (which are programmed using a M-bit digital code, here M=4) and three values of $R_0$. Trace 140 corresponds to $R_0=100\Omega$, trace 142 corresponds to $R_0=120\ \Omega$, and trace 144 corresponds to $R_0=140\ \Omega$. When D SST cells are turned on (assuming $0<D<2^M$), the output resistance decreases to approximately $(R_S+R_{on})/D$ where $R_{on}$ represents the MOSFET "on" resistance of each SST unit cell. Thus, the differential source impedance and output voltage swing are provided by the following equation.

$$R_{S,tot} = \frac{2(R_S + R_{on})}{D} \| R_0, V_{OUT} = V_{DD} \left[ \frac{\frac{D}{(R_S + R_{on})}}{\frac{1}{R_0} + \frac{D}{(R_S + R_{on})}} \right]. \tag{13}$$

For example, the design may use M=4, $R_0=100\text{-}140\Omega$, $V_{DD}=1.2$ V, $V_{CM}=0.6$ V, and $(R_S+R_{on})=2.4$ k$\Omega$. For this set of parameters, FIGS. 19A-19B confirm that both adequate impedance matching and linearity can be maintained by the SST driver over the entire range of digital values (i.e., FFE weights) D.

Figure 20:
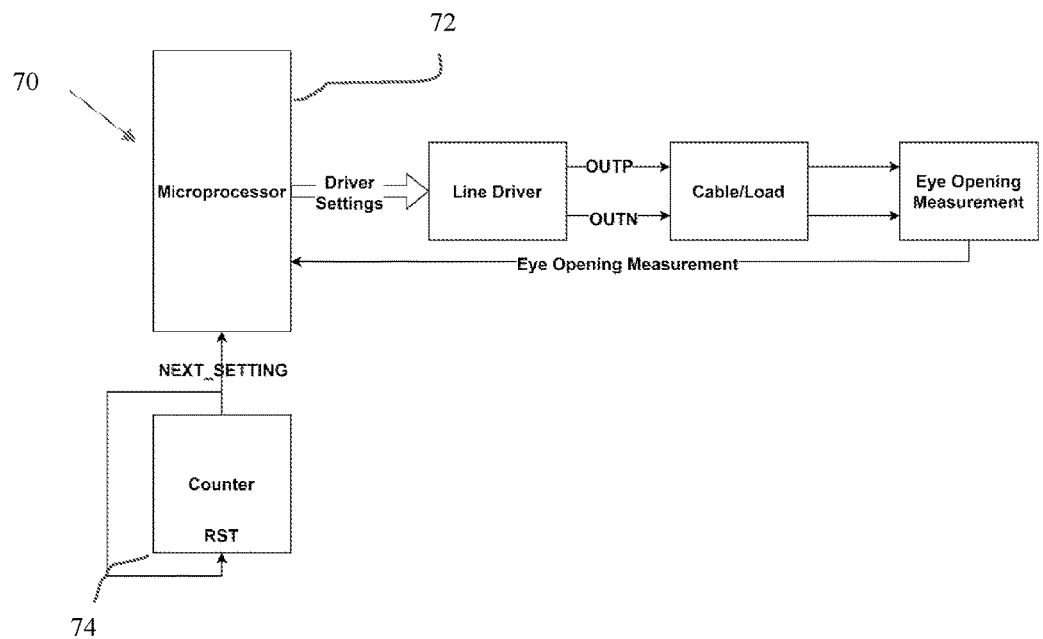
FIG. 20 is a block diagram of an automated circuit for optimizing pre-emphasis parameters associated with the line driver.
Figure 21:
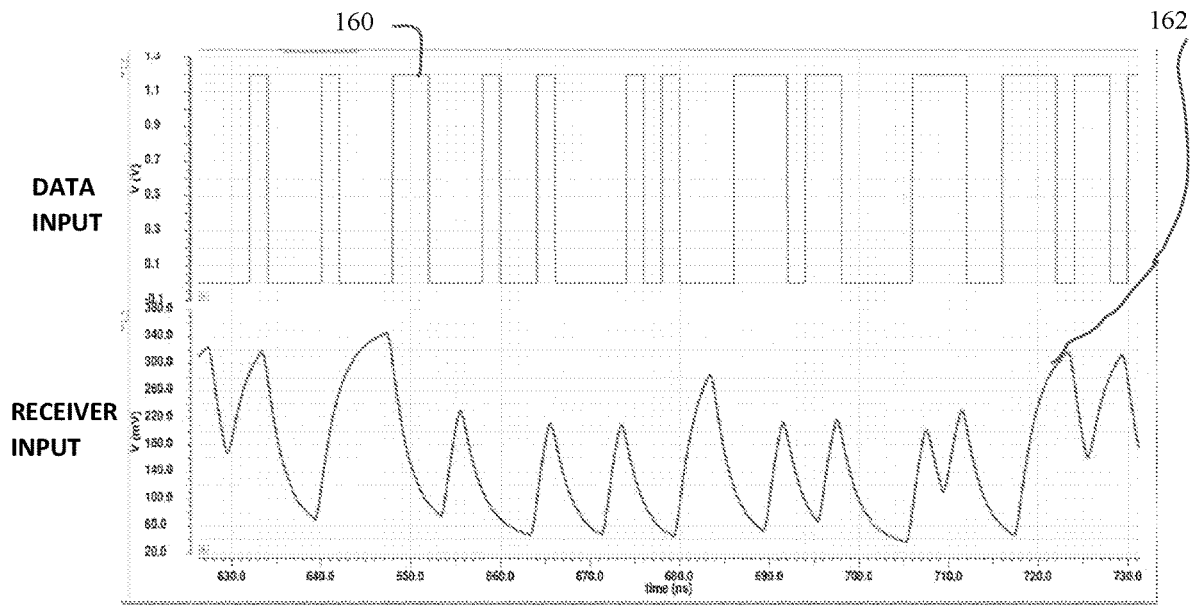
FIG. 21 shows transient waveforms at a cable input and output without pre-emphasis.

One potential issue with having a plethora of user-configurable settings is that it can become time consuming to find optimal driver characteristics for a specific cable and/or load. To address this issue, an optimization circuit is configured to allow automated calculation of driver performance metrics, such as the value of the eye opening at the receiver. As shown in FIG. 20, the optimization circuit 70 measures chosen performance metrics for given driver settings, records the measurement result, and then iteratively optimizes and/or maximizes the value of the metric by adjusting the driver settings under the control of an optimization algorithm, such as a stochastic gradient descent algorithm. The optimization circuit 70 also saves the measured value of the performance metric during the optimization process, thereby allowing the user to verify convergence of the algorithm and study the dependence of BER on the various driver settings.

The circuit uses a microprocessor 72 to execute the chosen iterative optimization algorithm. A counter 74, which is either internal or external to the microprocessor 72, keeps track of the number of iterations and stops the optimization process, either when the algorithm converges or when the user-specified maximum number of iterations is reached. In this way, the optimization circuit 70 can work completely autonomously. Users can post-process the data stored by the algorithm to find the optimum driver settings, as well as study dependence of the chosen performance metric on one or more driver settings.

Figure 22:
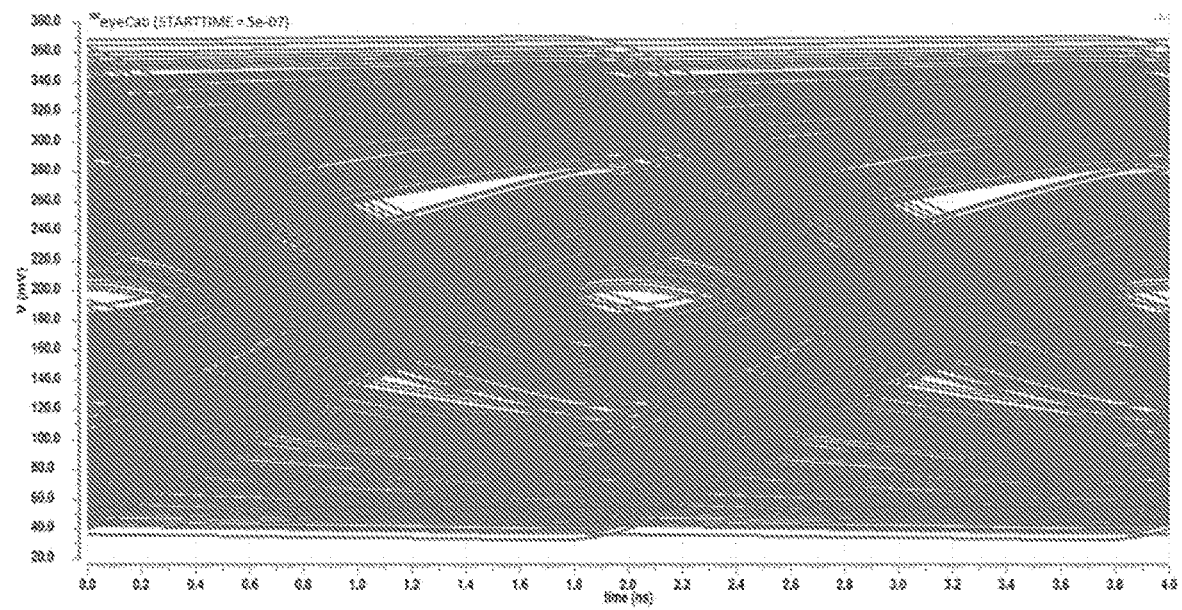
FIG. 22 shows a cable output eye diagram that is substantially closed in the absence of pre-emphasis.

An example implementation of an adaptive line driver in accordance with one or more embodiments disclosed herein was designed for accurate and precise data transmission at a 500 Mbps data rate using a 1.2V power supply with minimal power consumption. The data can be, for example, transmitted over 6 meters of flexible and high-loss Taiflex™ cable. FIG. 20 shows transient waveforms at a cable input 160 and a cable output 162 without the proposed FFE. FIG. 22 shows a cable output eye diagram that is substantially closed, which indicates that the transmit waveform requires modification.

Figure 23A:
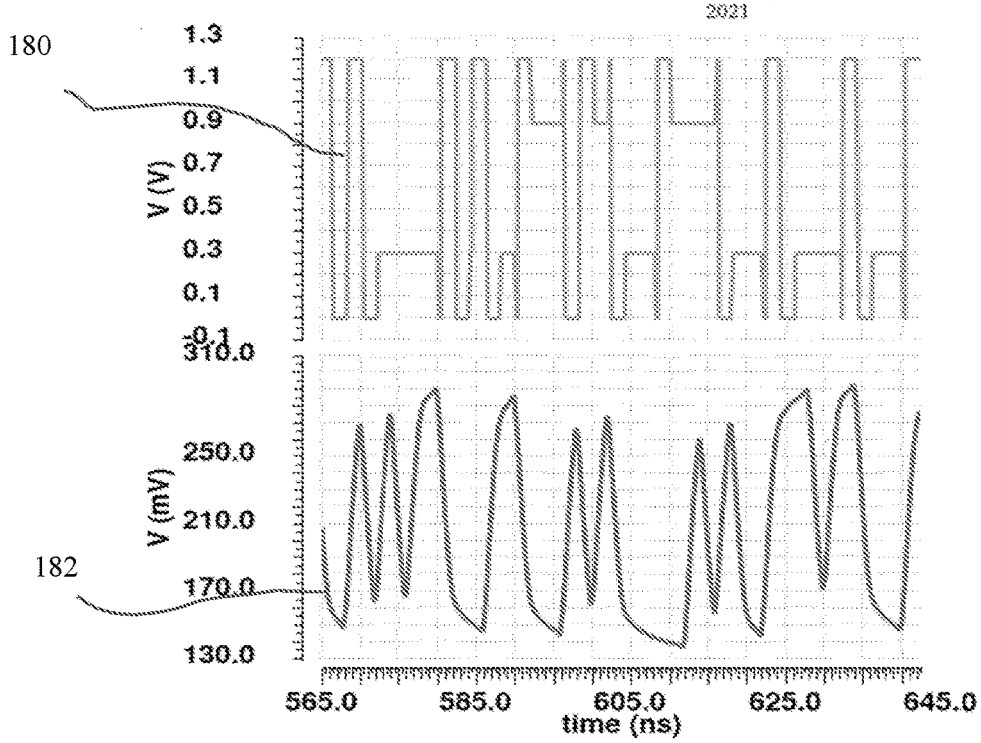
FIG. 23A shows transient voltage waveforms with pre-emphasis as a function of time.
Figure 23B:
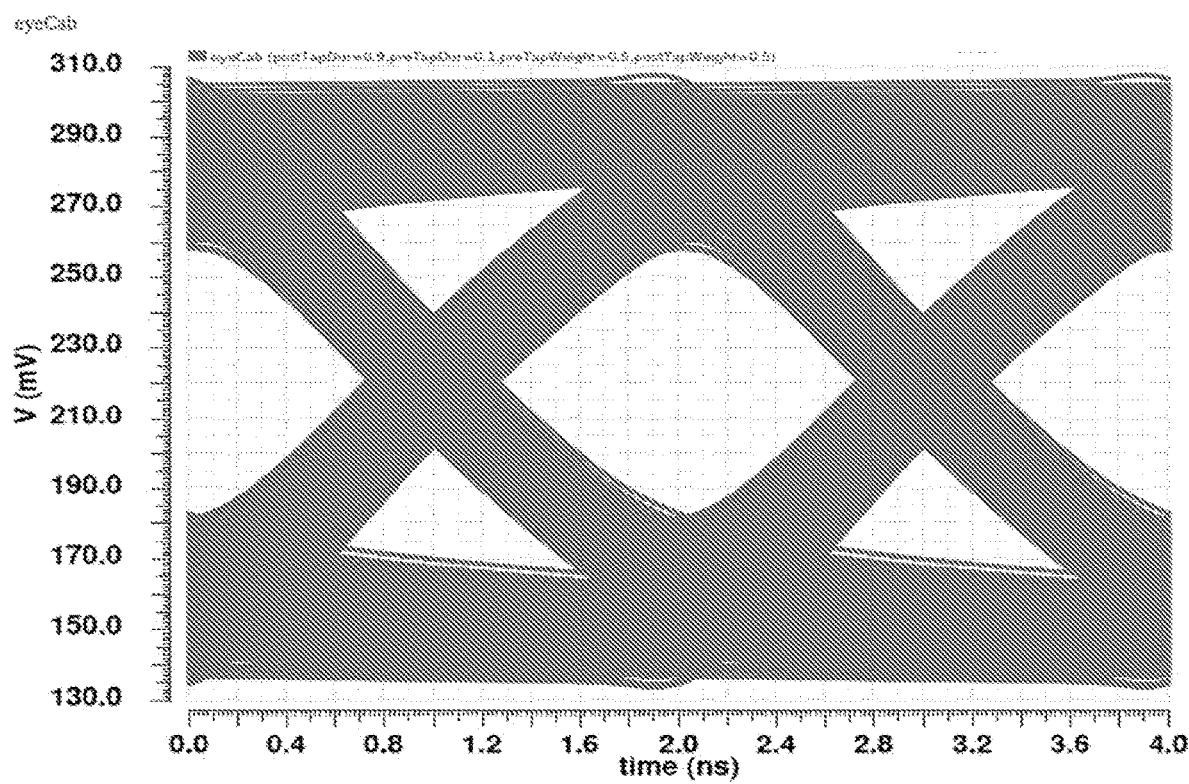
FIG. 23B shows a cable output eye diagram that is substantially open in the presence of pre-emphasis.

In order to create an appropriate pre-emphasis circuit, a user-definable delay is provided for each tap of the circuit. Based on optimal settings determined by simulation using Taiflex™ cable parameters, 3 taps (1 pre-data tap, 1 main-data tap and 1 post-data tap) are used with a main-data tap delay from the pre-data tap of 10% of UI, a post-data tap delay from the main-data tap of 90% of UI, and UI equal to 2 ns. These delays were implemented using the DLL. FIG. 23A shows the resulting transient voltage waveforms as a function of time, in which trace 180 represents the cable input signal and trace 182 represent the cable output signal. FIG. 23B shows an eye height of 74.85 mV, which is about 43% of the output swing, and an eye width of 1.44 ns, which is 72% of the UI. Thus, the received eye opening with pre-emphasis is sufficient for data to be directly read into an FPGA with low BER, which substantially reduces complexity of the equalization scheme at the receiver.

It is to be noted that pre-data and post-data taps are discussed herein as being opposite in polarity to the nearest data symbol. However, this characteristic is not required. In addition, one or more embodiments of the line driver provide (a) programmable amplitudes of the pre-data, data, and post-data taps, (b) programmable durations of the pre-data and post-data taps, and (c) a programmable quantity of pre-data and post-data taps while remaining within the intended scope of the disclosed subject matter.

Figure 24:
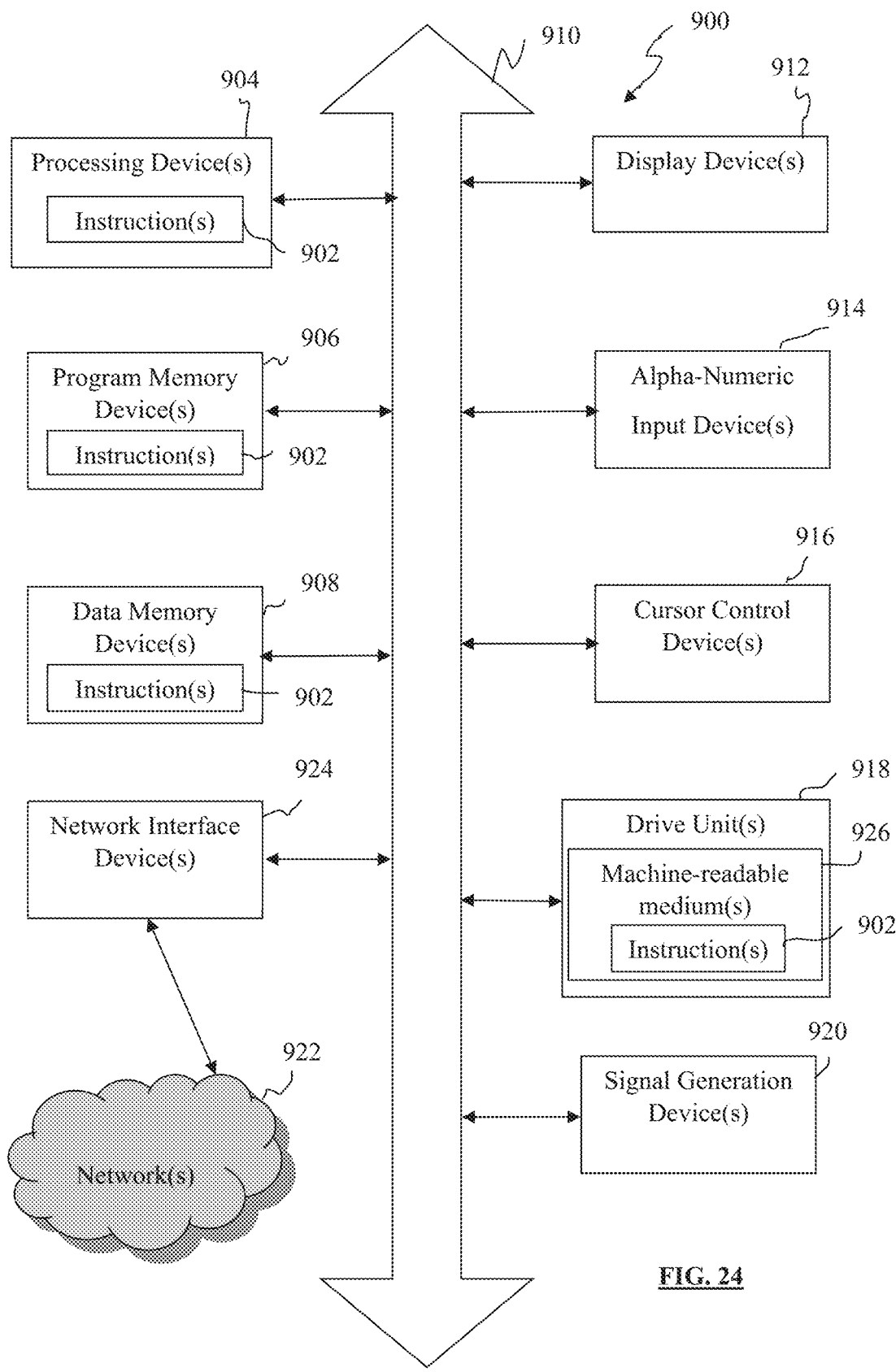
FIG. 24 is a block diagram of at least a portion of an exemplary machine in the form of a computing system that performs methods according to one or more embodiments disclosed herein.

One or more embodiments disclosed herein, or a portion thereof, may make use of software running on a computer or workstation. By way of example, only and without limitation, FIG. 24 is a block diagram of an embodiment of a machine in the form of a computing system 900, within which is a set of instructions 902 that, when executed, cause the machine to perform any one or more of the methodologies according to embodiments of the invention. In one or more embodiments, the machine operates as a standalone device; in one or more other embodiments, the machine is connected (e.g., via a network 922) to other machines. In a networked implementation, the machine operates in the capacity of a server or a client user machine in a server-client user network environment. Exemplary implementations of the machine as contemplated by embodiments of the invention include, but are not limited to, a server computer, client user computer, personal computer (PC), tablet PC, personal digital assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 900 includes a processing device(s) 904 (e.g., a central processing unit (CPU), a graphics processing unit (GPU), or both), program memory device(s) 906, and data memory device(s) 908, which communicate with each other via a bus 910. The computing system 900 further includes display device(s) 912 (e.g., liquid crystal display (LCD), flat panel, solid state display, or cathode ray tube (CRT)). The computing system 900 includes input device(s) 914 (e.g., a keyboard), cursor control device(s) 916 (e.g., a mouse), disk drive unit(s) 918, signal generation device(s) 920 (e.g., a speaker or remote control), and network interface device(s) 924, operatively coupled together, and/or with other functional blocks, via bus 910.

The disk drive unit(s) 918 includes machine-readable medium(s) 926, on which is stored one or more sets of instructions 902 (e.g., software) embodying any one or more of the methodologies or functions herein, including those methods illustrated herein. The instructions 902 may also reside, completely or at least partially, within the program memory device(s) 906, the data memory device(s) 908, and/or the processing device(s) 904 during execution thereof by the computing system 900. The program memory device(s) 906 and the processing device(s) 904 also constitute machine-readable media. Dedicated hardware implementations such as, but not limited to, ASICs, programmable logic arrays, and other hardware devices can likewise be constructed to implement methods described herein. Applications that include the apparatus and systems of various embodiments broadly include a variety of electronic and computer systems. Some embodiments implement functions in two or more specific interconnected hardware modules or devices with related control and data signals communicated between and through the modules, or as portions of an ASIC. Thus, the example system is applicable to software, firmware, and/or hardware implementations.

The term "processing device" as used herein is intended to include any processor, such as, for example, one that includes a CPU (central processing unit) and/or other forms of processing circuitry. Further, the term "processing device" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the display device(s) 912, input device(s) 914, cursor control device(s) 916, signal generation device(s) 920, etc., can be collectively referred to as an "input/output interface," and is intended to include one or more mechanisms for inputting data to the processing device(s) 904, and one or more mechanisms for providing results associated with the processing device(s). Input/output or I/O devices (including, but not limited to, keyboards (e.g., alpha-numeric input device(s) 914, display device(s) 912, and the like) can be coupled to the system either directly (such as via bus 910) or through intervening input/output controllers (omitted for clarity).

In an integrated circuit implementation of one or more embodiments of the invention, multiple identical dies are typically fabricated in a repeated pattern on a surface of a semiconductor wafer. Each such die may include a device described herein and may include other structures and/or circuits. The individual dies are cut or diced from the wafer, then packaged as integrated circuits. One skilled in the art would know how to dice wafers and package die to produce integrated circuits. Any of the exemplary circuits or method illustrated in the accompanying figures, or portions thereof, may be part of an integrated circuit. Integrated circuits so manufactured are considered part of this invention.

In accordance with various embodiments, the methods, functions, or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium including instructions 902, or that which receives and executes instructions 902 from a propagated signal so that a device connected to a network environment 922 can send or receive voice, video, or data, and to communicate over the network 922 using the instructions 902. The instructions 902 are further transmitted or received over the network 922 via the network interface device(s) 924. The machine-readable medium also contains a data structure for storing data useful in providing a functional relationship between the data and a machine or computer in an illustrative embodiment of the systems and methods herein.

While the machine-readable medium 902 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memory (e.g., solid-state drive (SSD), flash memory, etc.); read-only memory (ROM), or other non-volatile memory; random access memory (RAM), or other re-writable (volatile) memory; magneto-optical or optical medium, such as a disk or tape; and/or a digital file attachment to e-mail or other self-contained information archive or set of archives is considered a distribution medium equivalent to a tangible storage medium. Accordingly, the embodiment is considered to include anyone or more of a tangible machine-readable medium or a tangible distribution medium, as listed herein and including art-recognized equivalents and successor media, in which the software implementations herein are stored.

It should also be noted that software, which implements the methods, functions and/or logic herein, are optionally stored on a tangible storage medium, such as: a magnetic medium, such as a disk or tape; a magneto-optical or optical medium, such as a disk; or a solid state medium, such as a memory automobile or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

Although the specification describes components and functions implemented in the embodiments with reference to particular standards and protocols, the embodiments are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments are utilized and derived therefrom, such that structural and logical substitutions and changes are made without departing from the scope of this disclosure. Figures are also merely representational and are not drawn to scale. Certain proportions thereof are exaggerated, while others are decreased. Accordingly, the specification and drawings are to be regarded in an illustrative rather than a restrictive sense.

Such embodiments are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus, the following claims are hereby incorporated into the detailed description, with each claim standing on its own as a separate example embodiment.

The abstract is provided to comply with 37 C.F.R. § 1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus, the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings provided herein, one of ordinary skill in the art will be able to contemplate other implementations and applications of the techniques of the disclosed embodiments. Although illustrative embodiments have been described herein with reference to the accompanying drawings, it is to be understood that these embodiments are not limited to the disclosed embodiments, and that various other changes and modifications are made therein by one skilled in the art without departing from the scope of the appended claims.

What is claimed is:

1. An adaptive line driver circuit configured to transmit a signal over a wired link, the adaptive line driver circuit comprising:
    a delay-locked loop circuit, providing sub unit interval (UI) user-configurable durations adapted to form pre-emphasis and feed-forward equalization of the signal by retiming the signal, the delay locked loop circuit providing a user-configurable quantity of pre-emphasis taps to retime the signal;
    a signal retiming circuit providing pre-emphasis data tap outputs comprising a main data signal referenced to delayed clock outputs from the delay-locked loop circuit; and
a plurality of source-series terminated (SST) driver circuits, the source-series terminated (SST) driver circuits operatively coupled in groups to the signal re-timing circuit, a quantity of SST drivers in a group defining coefficients of pre-emphasis, groups of SST drivers operating in parallel with ganged outputs providing the signal to be transmitted.

2. The adaptive line driver, as defined by claim 1, wherein the delay locked-loop circuit further comprises a phase detector circuit, charge pump circuit, and voltage-controlled delay line circuit operatively coupled together.

3. The adaptive line driver, as defined by claim 1, further comprising a false lock correction circuit, the false lock correction circuit operatively coupled to the delay-locked loop circuit.

4. The adaptive line driver, as defined by claim 3, wherein the false lock correction circuit indicates a false lock condition in response to a total delay associated with the voltage-controlled delay line exceeding one unit interval (UI) in a locked state, the false lock correction circuit entering a shutdown mode in response to determining that taps associated with an interpolator circuit do not indicate the false lock condition, the false lock correction circuit entering a startup mode in response to the DLL circuit being reset.

5. The adaptive line driver, as defined by claim 1, further comprising an external pre-emphasis parameter optimization circuit, the external pre-emphasis parameter optimization circuit operatively coupled to the line driver.

6. The adaptive line driver, as defined by claim 5, wherein the external pre-emphasis parameter optimization circuit iteratively calculates an optimal value of the user-configurable parameter based on a value of an eye opening.

7. The adaptive line driver, as defined by claim 1, further comprising an interpolator circuit, the interpolator circuit operatively coupled to the delay-locked loop circuit.

8. The adaptive line driver, as defined by claim 7, wherein the interpolator circuit configures at least one of the pre-data tap duration and post-data tap duration, thereby providing time delayed signals from the DLL equal to a fraction of the UI, the UI being equal to a transmitting symbol interval.

9. A method of transmitting a signal over a wired link, the method comprising:
    providing sub unit interval (UI) user-configurable durations adapted to form pre-emphasis and feed-forward equalization of the signal by retiming the signal using a delay-locked loop circuit;
    providing a user-configurable quantity of pre-emphasis taps to retime the signal using the delay locked loop circuit;
    providing pre-emphasis data tap outputs comprising a main data signal referenced to delayed clock outputs from the delay-locked loop circuit using a signal retiming circuit; and
    defining coefficients of pre-emphasis using a quantity of source-series terminated (SST) drivers in a group, a plurality of SST driver circuits operatively coupled in groups to the signal re-timing circuit, the groups of SST drivers operating in parallel with ganged outputs providing the signal to be transmitted.

10. A hardware device constructed to implement the method of claim 9.

* * * * *